(12) United States Patent
Gibson

(10) Patent No.: US 12,502,537 B2
(45) Date of Patent: Dec. 23, 2025

(54) VESTIBULAR CLINICAL SUPPORT SYSTEM FUNCTIONALITY

(71) Applicant: Cochlear Limited, Macquarie University (AU)

(72) Inventor: Peter Gibson, South Coogee (AU)

(73) Assignee: Cochlear Limited, Macquarie University (AU)

( * ) Notice: Subject to any disclaimer, the term of this patent is extended or adjusted under 35 U.S.C. 154(b) by 318 days.

(21) Appl. No.: 18/005,074

(22) PCT Filed: Jun. 7, 2021

(86) PCT No.: PCT/IB2021/054980
§ 371 (c)(1),
(2) Date: Jan. 11, 2023

(87) PCT Pub. No.: WO2022/018531
PCT Pub. Date: Jan. 27, 2022

(65) Prior Publication Data
US 2023/0338732 A1    Oct. 26, 2023

Related U.S. Application Data

(60) Provisional application No. 63/056,239, filed on Jul. 24, 2020.

(51) Int. Cl.
*A61N 1/36* (2006.01)
*G16H 40/67* (2018.01)

(52) U.S. Cl.
CPC ..... *A61N 1/36036* (2017.08); *A61N 1/36139* (2013.01); *G16H 40/67* (2018.01)

(58) Field of Classification Search
CPC .......................... A61N 1/36036; G16H 40/67
See application file for complete search history.

(56) References Cited

U.S. PATENT DOCUMENTS

| | | |
|---|---|---|
| 5,919,149 A | 7/1999 | Allum |
| 6,304,787 B1 | 10/2001 | Kuzma et al. |
| 6,383,150 B1 | 5/2002 | Stewart et al. |

(Continued)

FOREIGN PATENT DOCUMENTS

| | | |
|---|---|---|
| CN | 111345783 A | 6/2020 |
| KR | 10-2013-0086346 A | 8/2013 |

(Continued)

OTHER PUBLICATIONS

Afzal et al., "Evaluating the effects of kinesthetic biofeedback delivered using reaction wheels on standing balance." Journal of healthcare engineering. Jun. 11, 2018; vol. 2018, 10 pages.

(Continued)

*Primary Examiner* — Carl H Layno
*Assistant Examiner* — Bryan McAllister Lee
(74) *Attorney, Agent, or Firm* — Edell, Shapiro & Finnan, LLC

(57) ABSTRACT

An example method includes obtaining vestibular biological state data and external sensor data over a period of time. Changes in one or both of the vestibular biological state data and the external sensor data over the period of time are monitored. The changes over time are used to determine a performance of the vestibular system of the recipient based on the changes.

24 Claims, 7 Drawing Sheets

(56) References Cited

U.S. PATENT DOCUMENTS

| | | |
|---|---|---|
| 6,421,569 B1 | 7/2002 | Treaba et al. |
| 6,546,291 B2 | 4/2003 | Merfeld et al. |
| 7,146,227 B2 | 12/2006 | Dadd et al. |
| 7,225,028 B2 | 5/2007 | Della Santina et al. |
| 7,231,257 B2 | 6/2007 | McDermott et al. |
| 7,269,461 B2 | 9/2007 | Dadd et al. |
| 7,272,449 B2 | 9/2007 | Dadd et al. |
| 7,382,850 B2 | 6/2008 | Zierhofer |
| 7,451,000 B2 | 11/2008 | Gibson et al. |
| 7,555,352 B2 | 6/2009 | Dadd et al. |
| 7,561,709 B2 | 7/2009 | Vandali et al. |
| 7,647,120 B2 | 1/2010 | Della Santina et al. |
| 7,782,358 B2 | 8/2010 | Nieminen et al. |
| 7,792,586 B2 | 9/2010 | Dadd et al. |
| 7,801,617 B2 | 9/2010 | Dijk et al. |
| 7,822,487 B2 | 10/2010 | Dadd et al. |
| 7,860,573 B2 | 12/2010 | van den Honert |
| 7,867,140 B2 | 1/2011 | Chiari et al. |
| 7,894,916 B2 | 2/2011 | Gibson et al. |
| 7,933,654 B2 | 4/2011 | Merfeld et al. |
| 7,974,711 B2 | 7/2011 | Dadd et al. |
| 7,974,712 B2 | 7/2011 | Gibson et al. |
| 7,983,767 B2 | 7/2011 | Dadd et al. |
| 7,983,768 B2 | 7/2011 | Dadd et al. |
| 8,103,362 B2 | 1/2012 | Dadd et al. |
| 8,249,724 B2 | 8/2012 | Risi et al. |
| 8,265,773 B2 | 9/2012 | Dadd et al. |
| 8,301,269 B2 | 10/2012 | Gibson et al. |
| 8,355,793 B2 | 1/2013 | Dadd et al. |
| 8,396,570 B2 | 3/2013 | Dadd et al. |
| 8,454,529 B2 | 6/2013 | Daly et al. |
| 8,460,315 B2 | 6/2013 | Gibson et al. |
| 8,617,097 B2 | 12/2013 | Dadd et al. |
| 8,620,459 B2 | 12/2013 | Gibson et al. |
| 8,751,019 B2 | 6/2014 | Dadd et al. |
| 8,764,676 B2 | 7/2014 | Prakash et al. |
| 8,768,484 B2 | 7/2014 | Della Santina et al. |
| 8,782,884 B2 | 7/2014 | Capcelea et al. |
| 8,805,546 B2 | 8/2014 | Dadd et al. |
| 8,843,217 B1 | 9/2014 | Keller et al. |
| 8,855,774 B2 | 10/2014 | Soto-Eguibar et al. |
| 8,868,202 B2 | 10/2014 | Della Santina et al. |
| 8,909,349 B2 | 12/2014 | Dadd et al. |
| 8,965,520 B2 | 2/2015 | Botros et al. |
| 9,031,661 B2 | 5/2015 | Smith et al. |
| 9,084,893 B2 | 7/2015 | Vandali et al. |
| 9,089,692 B2 | 7/2015 | Risi et al. |
| 9,101,732 B2 | 8/2015 | Dadd et al. |
| 9,144,677 B2 | 9/2015 | Garnham et al. |
| 9,173,585 B2 | 11/2015 | Tsampazis et al. |
| 9,211,407 B2 | 12/2015 | Della Santina et al. |
| 9,242,094 B2 | 1/2016 | Della Santina et al. |
| 9,338,567 B2 | 5/2016 | Mauger et al. |
| 9,339,649 B2 | 5/2016 | Cushing et al. |
| 9,352,144 B2 | 5/2016 | Paul et al. |
| 9,415,208 B2 | 8/2016 | Dadd et al. |
| 9,427,568 B2 | 8/2016 | Dadd et al. |
| 9,473,852 B2 | 10/2016 | Buyens |
| 9,511,226 B2 | 12/2016 | Pelizzone et al. |
| 10,052,062 B2 | 8/2018 | De Sapio et al. |
| 10,207,101 B2 | 2/2019 | Galea et al. |
| 10,220,201 B2 | 3/2019 | Mauch et al. |
| 10,225,671 B2 | 3/2019 | Goorevich et al. |
| 10,231,648 B2 | 3/2019 | Plotnik-Peleg et al. |
| 10,307,084 B2 | 6/2019 | Forth et al. |
| 10,342,461 B2 | 7/2019 | Basta et al. |
| 10,368,770 B2 | 8/2019 | Lithgow |
| 10,398,897 B2 | 9/2019 | Owen et al. |
| 10,413,728 B2 | 9/2019 | Carter et al. |
| 10,543,125 B2 | 1/2020 | Dadd et al. |
| 2004/0230254 A1 | 11/2004 | Harrison et al. |
| 2004/0234089 A1 | 11/2004 | Rembrand et al. |
| 2005/0131272 A1 | 6/2005 | Waldmann |
| 2005/0240253 A1 | 10/2005 | Tyler et al. |
| 2006/0235500 A1 | 10/2006 | Gibson et al. |
| 2007/0208403 A1 | 9/2007 | Della Santina et al. |
| 2008/0275293 A1 | 11/2008 | Lattner et al. |
| 2010/0198301 A1 | 8/2010 | Smith |
| 2010/0296661 A1 | 11/2010 | Goorevich et al. |
| 2011/0046435 A1 | 2/2011 | Jensen et al. |
| 2011/0082521 A1 | 4/2011 | Botros et al. |
| 2011/0275953 A1 | 11/2011 | Polak et al. |
| 2012/0130465 A1 | 5/2012 | Risi et al. |
| 2012/0150294 A1 | 6/2012 | Weinberg et al. |
| 2012/0226187 A1 | 9/2012 | Bierer et al. |
| 2012/0226332 A1 | 9/2012 | Chambers et al. |
| 2012/0300953 A1 | 11/2012 | Mauch et al. |
| 2013/0066424 A1 | 3/2013 | Hessler et al. |
| 2013/0120147 A1 | 5/2013 | Narasimhan et al. |
| 2013/0131761 A1 | 5/2013 | Della Santina et al. |
| 2014/0026664 A1 | 1/2014 | Gannot et al. |
| 2015/0256948 A1 | 9/2015 | Nielsen |
| 2016/0066821 A1 | 3/2016 | Mestrovic et al. |
| 2016/0203692 A1 | 7/2016 | Ten Kate et al. |
| 2016/0220153 A1 | 8/2016 | Annegarn et al. |
| 2016/0310738 A1 | 10/2016 | Mauch et al. |
| 2017/0006931 A1* | 1/2017 | Guez ............... A61B 5/369 |
| 2017/0035343 A1 | 2/2017 | Curtiss |
| 2017/0080212 A1 | 3/2017 | Dadd et al. |
| 2017/0172465 A1 | 6/2017 | Osorio |
| 2017/0359659 A1 | 12/2017 | Von Brasch et al. |
| 2017/0360364 A1 | 12/2017 | Heasman et al. |
| 2018/0280687 A1 | 10/2018 | Carter et al. |
| 2019/0070413 A1 | 3/2019 | Phillips et al. |
| 2019/0167977 A1 | 6/2019 | Risi et al. |
| 2020/0046978 A1 | 2/2020 | Kaufmann et al. |
| 2020/0113513 A1* | 4/2020 | Hirano ............... H04R 17/00 |
| 2020/0238002 A1 | 7/2020 | Heasman et al. |

FOREIGN PATENT DOCUMENTS

| | | |
|---|---|---|
| KR | 10-1715502 B1 | 3/2017 |
| WO | WO2000066215 | 11/2000 |
| WO | WO2002047547 A1 | 6/2002 |
| WO | WO2003070322 A1 | 8/2003 |
| WO | 2016-199142 A1 | 12/2016 |
| WO | WO2019073348 A2 | 4/2019 |
| WO | WO2019173107 | 9/2019 |

OTHER PUBLICATIONS

Alhasan et al., "The effect of visual biofeedback on balance in elderly population: a systematic review." Clinical interventions in aging. 2017;12:487-497.

Barbara et al., "Early Assessment of Vestibular Function after Unilateral Cochlear Implant Surgery", Audiology Neurotology, 25: 50-59 (2020).

Curthoys, "Concepts and Physiological Aspects of the Otolith Organ in Relation to Electrical Stimulation", Audiology Neurotology, 25: 25-34 (2020).

Emami et al., "Saccular Dysfunction in Low-Frequency Age-Related Sensorineural Hearing Loss," 5 pages, Apr. 10, 2017.

Emami et al., "Vestibular hearing and neural synchronization." ISRN otolaryngology. vol. 2012, 6 pages, dated 2012.

Emami, "Hypersensitivity of vestibular system to sound and pseudoconductive hearing loss in deaf patients," International Scholarly Research Notices. vol. 2014, 5 pages, dated 2014.

Hageman et al., "Design of a vestibular prosthesis for sensation of gravitoinertial acceleration." Journal of Medical Devices. Sep. 1, 2016;10(3), 3 pages.

Harris, "New Concepts in Electrical Stimulation in Vestibular Dysfunction." Audiology and Neurotology. 2020;25(1-2) p. 5.

Hsieh et al., "A wearable walking monitoring system for gait analysis." In 2012 Annual International Conference of the IEEE Engineering in Medicine and Biology Society Aug. 28, 2012 (pp. 6772-6775). IEEE.

Manrique-Huarte et al., "Correlation between High-Resolution Computed Tomography Scan Findings and Histological Finds in Human Vestibular End Organs and Surgical Implications", Audiology Neurotology, 25: 42-49 (2020).

(56) References Cited

OTHER PUBLICATIONS

Mirelman et al., "Audio-biofeedback training for posture and balance in patients with Parkinson's disease. Journal of neuroengineering and rehabilitation." Dec. 1, 2011;8(1):35, 7 pages.
Perez-Fernandez et al., "Bilateral Vestibular Hypofunction in the Time of the Video Head Impulse Test", Audiology Neurotology, 25: 72-78 (2020).
Phillips et al., "Interactions between Auditory and Vestibular Modalities during Stimulation with a Combined Vestibular and Cochlear Prosthesis", Audiology Neurotology, 25: 96-108 (2020).
Ramos de Miguel et al., "Vestibular response to electrical stimulation of the otolith organs. implications in the development of a vestibular implant for the improvement of the sensation of gravitoinertial accelerations." Journal of International Advanced Otology. 13(2):154-161, dated 2017.
Ramos de Miguel et al., "The Superiority of the Otolith System", Audiology Neurotology, 25: 35-41 (2020).
Ramos Macias et al., "Chronic Electrical Stimulation of the Otolith Organ: Preliminary Results in Humans with Bilateral Vestibulopathy and Sensorineural Hearing Loss", Audiology Neurotology, 25: 79-90 (2020).
Sluydts et al., "Electrical Vestibular Stimulation in Humans: A Narrative Review", Audiology Neurotology, 25: 6-24 (2020).
Starkov et al., "Restoring the High-Frequency Dynamic Visual Acuity with a Vestibular Implant Prototype in Humans", Audiology Neurotology, 25: 91-95 (2020).
Todd et al., "Vestibular receptors contribute to cortical auditory evoked potentials." Hearing Research. Mar. 1, 2014;309:63-74.
Todd, "Evidence for a behavioral significance of saccular acoustic sensitivity in humans," J Acoust Soc Am. Jul. 2001;110(1):380-390. [Abstract only].
Wolter et al., "BalanCI: Head-Referenced Cochlear Implant Stimulation Improves Balance in Children with Bilateral Cochleovestibular Loss", Audiology Neurotology, 25: 60-71 (2020).
Zijlstra et al., "Biofeedback for training balance and mobility tasks in older populations: a systematic review." Journal of neuroengineering and rehabilitation. 7(1):58, 15 pages, Dec. 1, 2010.
"Medication." Retrieved from the Internet: <URL: https://vestibular.org/article/diagnosis-treatment/treatments/medication/>, 6 pages, Retrieved on Jan. 22, 2020.
"New Concepts in Electrical Stimulation in Vestibular Dysfunction", Audiology & Neurotology, 25: 1-2 (2020).
An interim exploitation plan, Grant Agreement No. 801127, "European Development of Bionic Vestibular Implant for Bilateral Vestibular Dysfunction," Nov. 15, 2019, 20 pages.
Broadcasting and communication plan of project results, Grant Agreement No. 801127, "European Development of Bionic Vestibular Implant for Bilateral Vestibular Dysfunction," Nov. 31, 2018, 46 pages.
Data management plan RPT1, Grant Agreement No. 801127, "European Development of Bionic Vestibular Implant for Bilateral Vestibular Dysfunction," Feb. 31, 2019, 10 pages.
Review meeting documents RP, Grant Agreement No. 801127, "European Development of Bionic Vestibular Implant for Bilateral Vestibular Dysfunction," Oct. 31, 2019, 97 pages.
"Author Index," Audiology & Neurotology, vol. 25, No. 1-2, p. 109, dated 2020.
International Search Report and Written Opinion in counterpart International Application No. PCT/IB2021/054980, mailed Sep. 15, 2021, 10 pages.
Trune, et al, Corticosteroid Therapy for Hearing and Balance Disorders, Anat Rec (Hoboken). Nov. 2012 ; 295(11): 1928-1943. doi:10.1002/ar.22576.
Sara M.K. Madsen et al., "Effect of harmonic rank on sequential sound segregation", Hearing Research 367 (2018) 161e168, Jun. 2018, 8 pages.
Donal G. Sinex, "Spectral Processing and Sound Source Determination", Published in final edited form as: Int Rev Neurobiol. 2005 ; 70: 371-398. doi:10.1016/S0074-7742(05)70011-8.
Cochlear, "Nucleus Freedom implant with Straight electrode," Surgeon's Guide, 28 pages, dated 2016.
International Search Report and Written Opinion in counterpart International Application No. PCT/IB2021/054975, mailed Sep. 15, 2021, 10 pages.
Choi et al., Electrode Impedance Fluctuations as a Biomarker for Inner Ear Pathology After Cochlear Implantation, Otology & Neurotology, 2017, V38(10):1433-1439. doi: 10.1097/MAO.0000000000001589.
Shaul et al, Electrical Impedance as a Biomarker for Inner Ear Pathology Following Lateral Wall and Peri-modiolar Cochlear Implantation, Otology & Neurotology, 2019, 40(5): e518-e526. doi: 10.1097/MAO.0000000000002227.
Fornos et al. (2014) Artificial balance: restoration of the vestibuloocular reflex in humans with a prototype vestibular neuroprosthesis. Front. Neural. 5:66. doi: 10.3389/fneur.2014.00066 (Year: 2014).
Ngyuen, et al., "Characterization of Cochlear, Vestibular and Cochlear-Vestibular Electrically Evoked Compound Action Potentials in Patients with a Vestibulo-Cochlear Implant," Frontiers in Neuroscience, Nov. 21, 2017, 12 pages.

* cited by examiner

VESTIBULAR CLINICAL SUPPORT SYSTEM FUNCTIONALITY

BACKGROUND

Medical devices have provided a wide range of therapeutic benefits to recipients over recent decades. Medical devices can include internal or implantable components/devices, external or wearable components/devices, or combinations thereof (e.g., a device having an external component communicating with an implantable component). Medical devices, such as traditional hearing aids, partially or fully-implantable hearing prostheses (e.g., bone conduction devices, mechanical stimulators, cochlear implants, etc.), pacemakers, defibrillators, functional electrical stimulation devices, and other medical devices, have been successful in performing lifesaving and/or lifestyle enhancement functions and/or recipient monitoring for a number of years.

The types of medical devices and the ranges of functions performed thereby have increased over the years. For example, many medical devices, sometimes referred to as "implantable medical devices", now often include one or more instruments, apparatus, sensors, processors, controllers or other functional mechanical or electrical components that are permanently or temporarily implanted in a recipient. These functional devices are typically used to diagnose, prevent, monitor, treat, or manage a disease/injury or symptom thereof, or to investigate, replace or modify the anatomy or a physiological process. Many of these functional devices utilize power and/or data received from external devices that are part of, or operate in conjunction with, implantable components.

SUMMARY

In a first example, there is a method comprising: obtaining, over a period of time, vestibular biological state data with an implanted vestibular sensor of a recipient; and obtaining, over the period of time, external sensor data with one or more external devices associated with the recipient; determine changes in one or both of the vestibular biological state data and the external sensor data over the period of time; and determining a performance of the vestibular system of the recipient based on the changes.

In a second example, there is a computer-readable medium having instructions thereon that, when executed by one or more processors, cause the one or more processors to: obtain vestibular biological state data from a vestibular device of a recipient; obtain external sensor data from one or more external devices associated with the recipient; store the obtained implanted vestibular biological state data and external sensor data; determine one or more trends in the obtained implanted vestibular biological state data and external sensor data; and determine a performance of the vestibular system of the recipient based on the one or more trends.

In a third example, there is a system comprising: a vestibular device of a recipient; and one or more processors configured to: obtain vestibular biological state data from a vestibular device of a recipient; obtain external sensor data from an external device of the recipient; store the obtained implanted vestibular biological state data and external sensor data; monitor one or more trends in the obtained vestibular biological state data and external sensor data; and determine a performance of the vestibular system of the recipient based on the one or more trends.

BRIEF DESCRIPTION OF THE DRAWINGS

The same number represents the same element or same type of element in all drawings.

DETAILED DESCRIPTION

Figure 1:
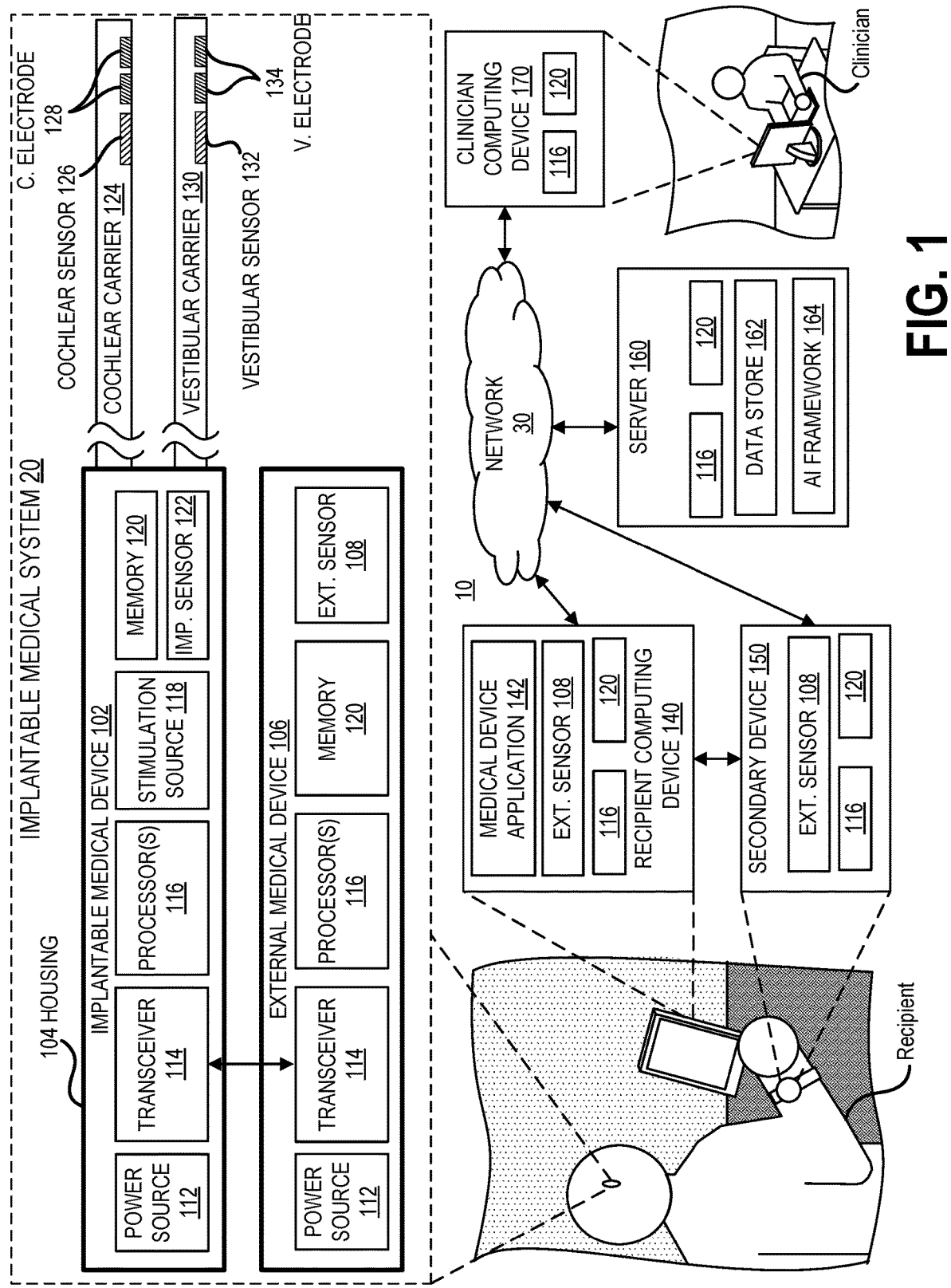
FIG. 1 illustrates an example system.

Sensory impulses relating to balance and spatial orientation are generated by the human vestibular system. These sensory impulses are perceived by the brain via the vestibulocochlear nerves and provide a sense of balance and spatial orientation. But disorders affecting the vestibular system (e.g., Ménière's disease, other bilateral vestibular disorders, or inflammation of vestibular anatomy) can cause vestibular deficiency by interfering with these sensory impulses, and thereby negatively affect one's sense of balance and spatial orientation. Vertigo can also result.

Some individuals with balance disorder and bilateral severe to profound hearing loss can be recipients of one or more vestibular implants and one or more cochlear implants. Depending on a number of factors, the devices are implanted in a variety of ways, such as: a combined cochlear implant and vestibular implant device implanted proximate one ear; separate cochlear and vestibular implants implanted proximate the same ear; a cochlear implant proximate one ear with a vestibular implant proximate another ear; a combined cochlear and vestibular implant proximate each of both ears; or only a vestibular implant proximate one or both ears.

Some individuals have a balance disorder plus severe to profound deafness in one ear and functional or aidable hearing in the other ear (e.g., asymmetric hearing loss). Such individuals can receive at least one vestibular implant and a cochlear implant. Depending on a number of factors, the devices used can be: a combined cochlear implant and vestibular implant device proximate the profoundly deaf ear and an optional hearing aid proximate the other ear; separate cochlear and vestibular implants both implanted proximate the profoundly deaf ear and an optional hearing aid for the other ear; a cochlear implant for the profoundly deaf ear and a vestibular implant plus hearing aid proximate the other ear; a cochlear implant proximate the profoundly deaf ear and vestibular implant proximate the other ear without a hearing aid; or only a vestibular implant proximate one or both ears.

Individuals can have functional or aidable hearing in both ears and have balance problems. Such individuals can have one or two vestibular devices with one or two hearing aids or no hearing devices at all.

Thus, a recipient can have a variety of devices. A clinical support system can facilitate management of the devices and the patient holistically, not as separate therapies. The devices can be configured to work together with common or complementary clinical care systems. There can also be synergies that can be achieved with multiple devices implanted in the one recipient.

Evaluation and support for recipients who do not perform as well as expected with therapies can be conducted. For example, a device or implantation defect can lead to compromised outcomes of either vestibular or cochlear therapy. An integrity test system can facilitate therapy analysis. Even without a defect, outcomes might not meet expectations. Decision support systems can assist in determining whether to replace a device would be beneficial. Another consideration for recipients with vestibular deficiencies is that, due to their fundamental condition affecting balance, they are more prone to falling Falls could lead to an impact to the device potentially causing damage to the device, such as damage to a receiver-stimulator, damage to electrodes, dislodgement of an implant body, or dislodgement of leads. The external devices associated with the vestibular implant or cochlear implant can include accelerometers or gyroscopes that can allow detection of falls and impact to the device. An accelerometer built into the implant can provide a measure of impact to the recipient's head or device, which can be useful in diagnosing cases of device failure or therapy decrement due to an impact associated with a fall.

The variety of combinations of hearing loss and vestibular dysfunction can create various factors that can be accounted for in the design of systems to optimize the overall benefit to the recipient and facilitate clinical care. Disclosed examples can facilitate management of multiple devices in the same patient, deciding on which ear the implant, and managing cases of device failure or unexpectedly poor outcomes without device failure. Disclosed examples can be implemented to recognize shared biology between cochlear and vestibular biological systems.

Vestibular Clinical Support System Functionality

Disclosed examples can provide vestibular clinical support system functionality. Examples can monitor patient condition through implant based objective measures. Recipients can have cochlear implants and vestibular implants in one or both ears, so there can be two implanted systems that can monitor the condition of the cochleovestibular system on one or both sides. Disclosed examples can periodically or continuously monitor the condition of the cochleovestibular biological system to detect changes that can be biological or device-related and which can implicate clinical assessment and management. Since the human hearing and vestibular systems are related, objective measures of the cochlea can provide valuable clinical information relevant to the vestibular system and vice versa. Electrophysiological techniques for monitoring the biological state of the cochlea can include impedance measures, neural response telemetry, and electrocochleography. Such techniques can be measured in an operating room, in a clinic, in a satellite clinic, or at the recipient's home. These measures of the cochlear biology and device condition can give insight into the general condition of the cochleovestibular complex which includes shared perilymph and endolymph.

For example, an indication of inflammation in the cochlea can be used to detect a concomitant issue that affects the vestibular system. For instance, certain issues affecting the vestibular conditions can be detected based on an impedance spike on a cochlear electrode. Monitoring objective measures via a cochlear implant system can alert clinicians or patients of an impending or existing issue for either the cochlear or vestibular systems so that suitable clinical treatment (e.g., steroids) can be applied in a timely manner.

Similarly, monitoring objective measures with a vestibular implant can give insight into the condition of the vestibular and cochlear systems of the recipient. Inflammation (or a cause thereof) can begin in the vestibular system and spread to the cochlea system. In some instances, the inflammation is first detectable at the vestibular electrode, before spreading and being detectable by the cochlear implant, allowing an earlier alert to a potential issue, which can result in timely clinical treatment.

Both cochlear and vestibular systems can be monitored and the resulting data can be used as inputs to an artificial intelligence system to ascertain a normal versus abnormal variation of the combined biological system. Various artificial intelligence techniques can be used. One implementation can be to use a machine-learning artificial intelligence to learn normal conditions of both the cochlear and vestibular systems and how they interact or interrelate so that an abnormal condition can be detected and an alert sent to the patient, caregiver, remote clinic or primary clinic. On receiving an alert, if a medical professional then diagnoses a potential escalation of an undesirable condition, the clinician may initiate appropriate treatment via drugs or other suitable means. The determination of suitable treatment can be facilitated by a decision-support system based on artificial intelligence technologies.

The interconnection between the cochlear and vestibular biological systems in the one ear can be extended to both ears. The two systems are biologically connected through blood supply and nervous systems, as well as general proximity. A recipient of a vestibular implant proximate one ear can have a cochlear implant proximate another ear. Measures of the cochleovestibular system on one side can be used to detect a condition of the other side or used to provide an early warning of a problem beginning on one side before the problem extends to the other.

Efficacy Measures

Vestibular implants and cochlear implants can include sensors to measure parameters that can be combined with the implant measures to add to the data available to assess patient condition in daily life. Hearing aids and other devices are also able to monitor some relevant parameters. This combined data can be used to support: treatment decisions, choices of clinical measures at the clinic, and for clinical studies to develop evidence of effectiveness, among other uses.

External processors associated with the implants or hearing aids can include accelerometers, gyroscopes, or other sensors that can provide a variety of data on the movement of the patient. This data can be analyzed for trends and applied as inputs to an artificial intelligence to assess the behavior of the recipient and balance functionality overall and ultimately the therapeutic benefit and compliance of the patient in using the devices.

Example parameters that can be measured can include stability when standing; stability or consistency of gait when walking; time to stand from a sitting position; time to sit from a standing position; percent of time in a day walking, standing/sitting, or lying prone; walking speed or distance; time and stability to walk up or down stairs; count, severity, regularity and trend of falls or stumbles; electroencephalography (EEG) measures; and other measures can be contemplated.

The condition of the patient can be measured not only through sensors of the medical device itself but also through personal wearable devices of the recipient. Personal wearable devices often have sensors recording measures in real time. The sensor data can be obtained from the personal wearable devices and combined with the implant, external processor, and hearing aid measures to add to the data available to assess patient condition in normal life at home, or for clinical measures at the clinic, or for clinical studies to develop scientific evidence of treatment efficacy. For example, many smartphones can measure activity levels such as walking, running, number of flights of stairs climbed in a period, and stepping movements. Such data can be extracted and used as a measure of the recipient's vestibular condition. Hearing aids and wearables can measure activity parameters similar to smart phones. Hearing aids can also measure physiological parameters such as electroencephalogram measures. Consumer wearables (e.g., FITBIT or APPLE WATCH devices) or cardiac monitors worn by athletes can monitor other physiological measures such as heart rate, oxygen saturation level, and body temperature, gait and time taken to sit or stand. There are also specifically designed gait monitoring systems. These measures can be used individually or combined with the data from the implant systems to improve sensitivity and specificity of the assessment of patient condition. A wearable device can be used in a pre-operative period to allow monitoring of an improvement in balance or gait function before and after implantation with a vestibular implant.

Techniques can be used to combine measurements, remote monitoring, and patient management to produce useful measures. Data logging of the selected measures can provide insight into the functionality of the patient's overall balance and vestibular functioning. Balance is supported by multiple biological systems, not just the cochleovestibular complex, such as vision and proprioceptors in muscles, tendons, and joints. Data logging of a combination of measures would provide greater insight into the patient and device condition than logging of the systems independently. Obtained data can be timestamped to facilitate comparison of data across relevant time periods. Real time connectivity between devices (e.g., via BLUETOOTH or other communication techniques) can be used to facilitate combining data.

Further, such sensors can be used to be able to determine whether systems are actually being used so that only valid data is used. For example, a person might be using their vestibular implant or cochlear implant system but not carrying their phone at the same time, so the phone data would likely be irrelevant in this instance. Disclosed techniques can be used to detect such an instance and prevent the data from the phone from being used. Correlations between sensors (e.g., accelerometers) in the different systems can be used to confirm which devices are being worn at the same time. Another technique could be to use location detection systems to determine locations of the relevant devices.

A server can be used to store the collected data. Having connected the relevant systems, it is then possible to report back to the patient, caregiver, satellite clinic or primary clinic so that timely assessment, treatment and overall management of any special event or undesirable trend can be initiated.

Accelerometers in the external devices for the vestibular implant, cochlear implant, or hearing aids worn on the head or in the implants may also give data on falls that would be useful to assist with diagnosis of device failures or movement of the implant or electrodes that may be used in diagnosing problems due to impacts.

Patient outcomes can be optimized by using the collected data. The data can be used as input to an artificial intelligence system to determine an efficacy of a current treatment system or diagnose a condition of a recipient's vestibular system. Among the various artificial intelligence techniques that can be used is a machine-learning framework that can be trained to detect normal versus abnormal vestibular functioning. The machine learning framework can receive data regarding the recipient (e.g., the measurements and parameters discussed above) and provide an output regarding the recipient's vestibular functioning. If the machine learning framework or another artificial intelligence system produces an output indicative of a potential issue (e.g., an increased likelihood of the monitored individual falling), a physician or a caregiver can be alerted. On receiving an alert, if a physician or clinician determines an impeding escalation of an undesirable condition, the physician or caregiver can initiate appropriate treatment or remedial actions. The determination of suitable treatment can also be facilitated by a decision-support system based on machine learning or artificial intelligence technologies.

The efficacy determination can be used in determining potential malfunction of a vestibular device. For example, changes in the vestibular implant device function can be detected based on trends in the measured data and the vestibular implant device data logs. Malfunction of the vestibular device can have several root causes, such as degradation of the hardware of the device due to a fall, movement of an electrode from the intended position due to a fall, or some other factor.

As well as assisting in managing patient performance, the measures and parameters may provide valuable data regarding the efficacy of vestibular treatment devices (e.g., for reimbursement or clinical study purposes). A candidate could be provided a vestibular implant processor prior to implantation to measure their balance and ability to engage in activities prior to surgery. This data can form a baseline against which post-operative data can be compared. This within-subject approach to gathering data on the improvement to patient activity can be compelling data that demonstrates the efficacy of vestibular stimulation.

An example system that can be used to implement one or more of the above or other aspects is shown in FIG. 1, below.

Example System

FIG. 1 illustrates an example system 10. The system 10 includes an implantable medical system 20, a network 30, a recipient computing device 140, one or more secondary devices 150, a server computing device 160, and a clinician computing device 170.

The illustrated implantable medical system 20 can include an implantable medical device 102 implanted in a recipient. The implantable medical device 102 includes both cochlear and vestibular components. In some examples, there is overlap between cochlear and vestibular components, such as by a same power source 112 powering both the vestibular and cochlear components. In other examples, there are multiple different implantable medical devices 102, with one having cochlear components and the other having vestibular components. The cochlear components can be configured to stimulate the recipient's cochlea to cause the recipient to experience a hearing percept. The vestibular components can be configured to stimulate the recipient's vestibular system to provide therapeutic vestibular stimulation. The therapeutic vestibular stimulation can be stimulation configured to inhibit the functioning of the recipient's vestibular system, to cause the recipient to experience a vestibular percept, or both.

In implementations where the implantable medical device 102 includes one or more cochlear components, the implantable medical device 102 device is considered a cochlear device. In implementations where the implantable medical device 102 includes one or more vestibular components, the implantable medical device 102 device is considered a vestibular device. An implantable medical device 102 can be both a cochlear device and a vestibular device. Where the recipient has one or more devices that only affect one side of the recipient's cochleovestibular system (e.g., the left or right side), the recipient can be considered to have a unilateral device or system and the one or more devices can be referred to as a unilateral device. Where the recipient has one or more devices that individually or collectively affect both sides of the recipient's cochleovestibular system (e.g., a left side and a right side), the recipient can be considered to have a bilateral system and the devices can be considered to be of a bilateral system. Even in a bilateral system, a device that only affects one side can be considered a unilateral device.

The implantable medical device 102 can include a housing 104, a power source 112, a transceiver 114, one or more processors 116, a simulation source 118, a memory 120, an implantable sensor 122, a cochlear carrier 124, and a vestibular carrier 130, among other components.

The housing 104 can be an encasement constructed from or coated in a biocompatible material to facilitate long-term implantation of the implantable medical device 102 in a recipient. The housing 104 can surround and hermetically seal one or more components of the implantable medical device 102. In examples, the housing 104 includes a header providing an interconnection between one or more components within and external to the housing 104.

The power source 112 can be configured to provide operational power to components. The power sources 112 can be or include one or more rechargeable or non-rechargeable batteries of various technologies. In some examples, the power source 112 can be one or more capacitors configured to act as power sources. Power for the power source 112 can be received from a source (e.g., the external medical device 106) and stored in the power source 112. The power can then be distributed to the other components as needed for operation.

The transceiver 114 can be a component configured to receive or transmit a signal (e.g., a power signal or a data signal). In the illustrated example, the implantable medical device 102 can use the transceiver 114 to transcutaneously communicate with the external medical device 106. The transceiver 114 can be a collection of one or more components that form part of a transcutaneous energy or data transfer system to transfer the signal between the implantable medical device 102 and the external medical device 106. Various types of signal transfer, such as electromagnetic, capacitive, inductive transfer, or radiofrequency, can be used to usably receive or transmit the signal. The communication can be performed via any of a variety of different protocols, such as near-field communication (NFC), BLUETOOTH, or WI-FI. The transceiver 114 can include or be electrically connected to a coil or antenna to facilitate the transmission and reception of signals.

The one or more processors 116 can be electronic circuits that perform operations to control the performance of or be controlled by connected components (e.g., other components of the implantable medical device 102 or the system 10 overall). For example, the one or more processors 116 can include one or more microprocessors (e.g., central processing units) or microcontrollers. In certain examples, the one or more processors 116 can be implemented as one or more hardware or software processing units that can obtain and execute instructions. The processors 116 can be configured to perform one or more methods or operations described herein. In an example, the processors 116 can be connected to the memory 120 having instructions encoded thereon that configure the processors 116 to perform the method. For instance, the memory 120 can include instructions that, when executed by the one or more processors 116 cause the one or more processors 116 to perform one or more of the operations described herein.

The one or more processors 116 of the implantable medical device 102 can be used to control stimulation provided by the stimulation source 118. For example, the one or more processors 116 can be configured to cause stimulation via the one or more cochlear electrodes 128 or one or more of the vestibular electrodes 134. In some examples, the one or more processors 116 can include or act as a sound processor that detect or receive sound signals and generate output signals based thereon for use in stimulating a recipient's auditory system via the cochlear electrodes 128. The sound processor can perform sound processing and coding operations to convert input audio signals into output signals used to provide stimulation via the cochlear electrodes 128.

The stimulation source 118 is a component that generates electrical stimulation signals for use in stimulating target tissue. The stimulation source 118 can use or generate stimulation control signals to generate electrical stimulation signals for delivery to target tissue via one or electrodes. The stimulation can be monopolar or multi-polar electrical stimulation. In many examples, the stimulation source 118 includes a current source/sink that produces current pulses based on input received from the one or more processors 116. The stimulation source 118 can further include a voltage source.

The memory 120 can be one or more software- or hardware-based computer-readable storage media operable to store information. The memory 120 can be accessible by the one or more of the processors 116. The memory 120 can store, among other things, instructions executable by the one or more processors 116 to cause performance of operations described herein. In addition or instead, the memory 120 can store other data. The memory 120 can be volatile memory (e.g., RAM), non-volatile memory (e.g., ROM), or combinations thereof. The memory 120 can include transitory memory or non-transitory memory. The memory 120 can include one or more removable or non-removable storage devices. The memory 120 can include RAM, ROM, EEPROM (Electronically-Erasable Programmable Read-Only Memory), flash memory, optical disc storage, magnetic storage, solid state storage, or any other memory media usable to store information for later access. In examples, the memory 120 encompasses a modulated data signal (e.g., a signal that has one or more of its characteristics set or changed in such a manner as to encode information in the signal), such as a carrier wave or other transport mechanism and includes any information delivery media. The memory 120 can include wired media such as a wired network or direct-wired connection, and wireless media such as acoustic, RF, infrared and other wireless media or combinations thereof.

The implantable sensor 122 can be one or more sensor components of the implantable medical device 102 that obtain data, such as data regarding a surrounding environment, the implantable medical device 102, or the recipient. The implantable sensor 122 can generate signals based on sensed occurrences, such as data regarding the environment around the sensors 122. The implantable sensor 122 can include one or more sensors, such as one or more microphones, accelerometers, gyroscopic sensors, location sensors, telecoils, biosensors (e.g., heart rate sensor, temperature sensor, or blood pressure sensor), electrodes, and light sensors, among others. The implantable sensor 122 can include components disposed within the housing 104 of the implantable medical device 102 as well as devices electrically coupled to the implantable medical device 102 (e.g., via wired or wireless connections). Additional example sensors include an optical biosensor, an electrochemical biosensor, and a mass biosensor, among others. Such sensors can provide an electrical output representing a biological state proximate the sensor. For example, the optical biosensor can use light to extract data from physical properties of a target object, such as changes to the reflective index of a metal. The electrochemical biosensor is a device that employs one or more of potentiometry, amperometry, and conductometry to analyze the content of a biological sample. An optical biosensor or an electrochemical biosensor can be used to detect the presence or concentration of target molecules based on their spectral fingerprint. Such information can be used to assess the biological environment, presence of target molecules or conditions that may indicate the presence or absence of, for example, inflammation. The mass biosensor can use surface acoustic waves and piezoelectric effects for biosensing various parameters (e.g., metabolites, proteins, antigens, and microorganisms) that can indicate the condition of the recipient's cochlea or vestibular system.

The cochlear carrier 124 can be an elongate component configured to be implanted in a recipient's cochlea. The cochlear carrier 124 can be implemented in any of a variety of ways, including those described in U.S. Pat. No. 8,249,724, which is hereby incorporated herein by reference for any and all purposes. The cochlear carrier 124 can include one or more cochlear sensors 126 and one or more cochlear electrodes 128. The cochlear carrier 124 can be coupled to the housing 104.

The one or more cochlear sensors 126 can be sensors carried by the cochlear carrier 124. For example, the one or more cochlear sensors 126 can be coupled to or disposed in the cochlear carrier 124. The cochlear sensors 126 can be as described in relation to the implantable sensors 122. The cochlear sensors 126 can be specially configured to obtain data regarding the recipient's cochlea. In some examples, the implanted cochlear sensor 126 is a cochlear electrode 128.

The one or more cochlear electrodes 128 can be electrodes disposed on the cochlear carrier 124. The one or more cochlear electrodes 128 can have any of a variety of different shapes, sizes, profiles, and configurations. The cochlear electrodes 128 can be in the form of full-band or half-band or plate electrodes. In one example, the cochlear electrodes 128 can be half-band electrodes disposed on a medial surface of the cochlear carrier 124. It should be appreciated, however, that any electrodes now or later developed suitable for a particular application or therapeutic objective may be used in alternative embodiments. For example, the cochlear electrodes 128 can be banded electrodes extending substantially around the cochlear carrier 124. In another alternative embodiment, the cochlear electrodes 128 do not laterally extend to or around the edges of the carrier 202. The cochlear electrodes 128 can be manufactured from a biocompatible conductive material such as platinum, but other materials or combinations of materials can be used. In other examples, the cochlear electrodes 128 can be coated with a biocompatible covering that does not substantially interfere with the transfer of the stimulation signals to the recipient's cochlea.

The vestibular carrier 130 can be a carrier for one or more components configured to interact with the recipient's vestibular system. For instance, the illustrated vestibular carrier 130 has one or more vestibular electrodes 134 disposed thereon as well as one or more vestibular sensors 132. The vestibular carrier 130 can take any of a variety of forms. In an example, the vestibular carrier 130 is formed from a flexible material, such an elastomer (e.g., silicone). The vestibular carrier 130 can be configured to be implanted proximate vestibular tissue of a recipient.

The vestibular carrier 130 can be configured to be coupled to or is coupled to the implantable medical device 102 (e.g., to the housing 104 thereof). The vestibular carrier 130 can include one or more wires within the elongate carrier to connect one or more components (e.g., the vestibular electrodes 134) with the implantable medical device 102. In such a configuration, the vestibular carrier 130 can convey electrical stimulation signals from the implantable medical device to the vestibular electrodes 134 and then to vestibular tissue.

The one or more vestibular sensors 132. The one or more vestibular sensors 132 can be sensors carried by the vestibular carrier 130. For example, the one or more vestibular sensors 132 can be coupled to or disposed in the vestibular carrier 130. The vestibular sensors 132 can be as described in relation to the implantable sensors 122. The vestibular sensors 132 can be specially configured to obtain data regarding the recipient's vestibular system. In some examples, the implanted vestibular sensor 132 is a vestibular electrode 134.

The one or more vestibular electrodes 134 are electrically-conductive components via which stimulation can be provided. The vestibular electrodes 134 can share one or more characteristics as described above with respect to the cochlear electrodes 128. Example configurations of the vestibular electrodes 134 can include configurations to encourage or resist penetrating tissue of the recipient. In some examples, the vestibular electrodes 134 can act as both stimulation components and sensing components.

As illustrated, the one or more cochlear electrodes 128 and the cochlear sensor 126 are coupled to the implantable medical device 102 via a cochlear carrier 124, and the one or more vestibular sensors 132 and the one or more vestibular electrodes 134 are coupled to the same implantable medical device 102 via a vestibular carrier 130. In other examples, the vestibular and cochlear components can be coupled to separate cochlear and vestibular devices, each having one or more of the components described herein with respect to the implantable medical device 102.

The implantable medical device 102 can be configured to be communicatively coupled with an external medical device 106. In some examples, the implantable medical device 102 can depend on the external medical device 106 to function. In some examples, the implantable medical device 102 can function for extended periods of time without the external medical device 106 being present.

The external medical device 106 can be a non-implanted medical device configured to operate with the implantable medical device 102. As illustrated, the external medical device 106 can have one or more components that are similar to those components found in the implantable medical device 102, such as by including a power source 112, a transceiver 114, one or more processors 116, and memory 120. The external medical device 106 can include more or fewer components. As illustrated, the external medical device 106 can further include an external sensor 108. In some examples, the external medical device 106 is configured to perform various processing tasks, such as controlling stimulation provided by the implantable medical device 102. For example, the external medical device 106 can be configured to receive sound signals (e.g., from the external sensor 132 or streamed from the recipient computing device 140), process the sound signals, and send the result of the processing to the implantable medical device 102 via the transceiver 114 to cause the implantable medical device 102 to cause stimulation. In some examples, the external medical device 106 acts as a communication bridge between the implantable medical device 102 and another device. For instance, the implantable medical device 102 can obtain data from the implantable medical device 102 and transmit the data to the recipient computing device 140 (which can, in turn, transmit the data to another device, such as the server 160). In some examples, the external medical device 106 acts as a power source for the implantable medical device 102 by inductively charging the implantable medical device 102. In some examples, the external medical device 106 is wearable by the recipient. For instance, the implantable medical device 102 and the external medical device 106 can each include magnets that facilitate the alignment and retention of the implantable medical device 102 and the external medical device 106. In some implementations, the external medical device 106 is disposed in a band worn by the recipient.

The external sensor 132 of the external medical device 106 and various other devices of the system 10 can be a sensor external to the recipient's body. The external sensors 132 can take any of a variety of forms, such as microphones, accelerometers, gyroscopic sensors, location sensors, telecoils, biosensors (e.g., heart rate sensor, temperature sensor, or blood pressure sensor), and electrodes, among others. In some examples, the external sensors 132 include wearable electrode sensors, such as via a headband.

In some examples, the external sensor 132 includes a camera. A camera can be used to, for example, monitor the recipient's posture or eye movement. In addition or instead, a camera can be used to determine an activity in which the recipient is engaging. In addition or instead, a camera can be used to determine environmental aspects, such as the type of surface on which the recipient is walking (e.g., soft sand or firm ground). For example, a classifier can be trained to take still or moving images from the camera and determine where the recipient is or on what kind of surface the recipient is walking.

In an example, the external sensors 132 include one or more light sensors. One's ability to balance is influenced by various sense inputs, including what one sees. Thus, individuals with balance issues can be affected by whether they are in dark or light rooms because they may use their vision to compensate for the poor function of other aspects of their balance system. A light sensor can be used to determine whether or to what extent an environment is light or dark. Indications that a recipient has more difficulty balancing in dark environments compared to lighter environments may indicate that the recipient has a compromised vestibular system and is compensating by relying on visual cues to balance.

In an example, the external sensors 132 include one or more sensors configured to determine one or more characteristics of a surface on which the recipient is walking. For example, the external sensors 132 can include one or more radar, ultrasonic, or infrared sensors that are so configured. The output of such sensors can be provided to a classifier configured to take the output of the sensors as input and provide, as output, a classification of the surface on which the recipient is walking. The classification of the surface can include a relative difficulty of the surface or characteristics of the surface, such as slope (e.g., steep, mild, or flat), material (e.g., sand, concrete, or carpet) or unevenness (e.g., smooth or bumpy), among others.

In some examples, the external sensors 132 can include one or more foot sensors. Such sensors can be part of the recipient's footwear (e.g., shoes, inserts, or socks) and can include one or more pressure sensors or accelerometers. The sensors can produce data regarding how the recipient is balancing (e.g., based on how the recipient's foot applies pressure), the surface on which the recipient is walking, the recipient's gait, rate of movement, or other data.

In some examples, the implanted sensor 122 and the external sensor 132 can include sensors that obtain data regarding usage of the implantable medical device 102 or the external medical device 106. For example, the data can include data regarding whether one or more components are in use or how they are being used. The data can be used to check compliance by the recipient with a rehabilitation regimen.

In examples, a scene classifier can be used as a sensor. In some examples, one or more of the processors 116 are configured to act as the scene classifier or activity sensor, which can also act as one or more of the sensors 122, 132. A scene classifier is software that obtains data regarding the environment proximate the implantable medical system 20 (e.g., from one or more of the sensors 122, 132) and determines a classification of the environment. The classifications can be used to determine settings appropriate for the environment. For example, the scene classifier can obtain data regarding the sonic environment around the implantable medical system 20 and classify the sonic environment into one or more of the following possible classifications: speech, noise, and music, among other classifications. The implantable medical system 20 can then use the classification to automatically alter the sensory prosthesis settings to suit the environment. For example, responsive to the scene classifier determining that the sonic environment around the implantable medical system 20 is windy, a wind-noise scene is selected, which modifies settings to lessen wind noise. An example scene classifier is described in US 2017/0359659, filed Jun. 9, 2016, and entitled "Advanced Scene Classification for Prosthesis", which is incorporated by reference herein in its entirety for any and all purposes. Such scenes can be changed automatically by the implantable medical system 20 or by a command provided by the recipient. A scene classifier can, but need not be, limited to classifying a sonic environment. In an example, the scene classifier can be used to classify a visual environment (e.g., where the recipient is) and/or on what kind of surface the recipient is walking. Such classification can be performed using an artificial intelligence classifier trained to perform such classification.

Instead of or in addition to the implantable medical system 20, the system 10 can include one or more medical devices, such as sensory prostheses (e.g., auditory prostheses and visual prostheses), drug pumps, hearing aids, or consumer electronic devices coupled to a medical device. In some examples, the system 10 can include other devices as well, such as personal sound amplification products. Such devices can have one or more characteristics or components of the other devices described herein.

The network 30 can be an electronic communication network, such as the Internet, that facilitates the electronic communication of data among computing devices connected to the network 30.

The recipient computing device 140 can be a computing device associated with the recipient of the implantable medical device 102 or a caretaker of the recipient. In many examples, the recipient computing device 140 is a smart phone, tablet, augmented or virtual reality headset, smart watch, or heart rate monitor but can take other forms. In some examples, the recipient computing device 140 can be directly or indirectly coupled to the server 160. As illustrated, the recipient computing device 140 can include a medical device application 142, as well as one or more external sensors 108, one or more processors 116, and memory 120, among other components.

The medical device application 142 can operate on the recipient computing device 140 and cooperate with the implantable medical device 102 directly or via an intermediary device (e.g., the external medical device 106 that communicates with the implantable medical device 102 via the transceivers 114). For instance, the medical device application 142 can control the implantable medical device 102 (e.g., based on input received from the recipient), and obtain data from the implantable medical device 102. The recipient computing device 140 can connect to the implantable medical device 102 or the intermediary device using, for example, a wireless radiofrequency communication protocol (e.g., BLUETOOTH). The medical device application 142 can transmit data to or receive data from the implantable medical device 102 over such a connection. In some examples, the medical device application 142 can be configured to perform or cause to be performed one or more of the operations described in relation to the methods 200, 300 herein. In some examples the medical device application 142 can be part of a software package downloadable from a software distribution platform, such as a mobile phone or tablet application store.

The one or more secondary devices 150 can be one or more additional devices in addition to the implantable medical device 102, the external medical device 106, and the recipient computing device 140. The secondary devices 150 can be implantable or external devices. The secondary devices 150 can be, for example, a phone, tablet, smart watch, heart rate monitor, wearable electroencephalography device, pedometer, smart ring, virtual reality device (e.g., a virtual reality headset), augmented reality device (e.g., an augmented reality headset or an augmented view through a handheld device), or another device. The secondary devices 150 can be consumer electronics devices, such as a wearable consumer electronics device or a pocketable consumer electronics device. In some examples, the secondary devices 150 can be medical devices, such as a programmer or accessory for the implantable medical system 20. The one or more secondary devices 150 can be communicatively coupled to the recipient computing device 140. In some examples, the one or more secondary devices 150 can be directly or indirectly (e.g., via the recipient computing device 140) coupled to the server 160.

In some examples, the one or more sensory devices 150 can include one or more additional implanted or worn medical devices of the recipient that may have one or more sensors. In some examples, the recipient may have artificial or bionic joints, limbs, or other body parts that have sensors associated therewith. The output from those sensors can be used to produce data useful for making one or more determinations described herein.

The server 160 can be a computing device remote from one or more other components of the system 10. The server 160 can be communicatively coupled to the recipient computing device 140 and the clinician computing device 170. In many examples, the server 160 is indirectly communicatively coupled to the implantable medical device 102 through the recipient computing device 140 (e.g., via the medical device application 142) and one or more network components. In some examples, the server 160 is directly or indirectly communicatively coupled to the implantable medical device 102. The server 160 can include a data store 162 and an artificial intelligence framework 164, among components, such as one or more processors 116 and memory 120.

The data store 162 can be a component (e.g., hardware memory or one or more data structures stored in hardware memory) configured to store vestibular data, cochlear data, and related data. The data store 162 can store data regarding recipients of the implantable medical device 102. The data regarding the individuals can include various data relevant to techniques described herein. Such data can include, for example, name, age, gender, and medical information (e.g., medical history), among other data.

The artificial intelligence framework 164 can include one or more algorithms, libraries, pieces of software, or other frameworks that can individually or cooperatively obtain data, process the data, and provide an output based thereon. For example, the artificial intelligence framework 164 can be configured to receive data from the various sensors 108, 122, 126, 132 of the system 10 as input and provide useful data as output, such as data regarding a condition of the recipient. The artificial intelligence framework 164 can include one or more human-generated or curated artificial intelligence frameworks configured to receive data and provide output. Such artificial intelligence techniques can include, for example, decision trees, thresholding, heuristics, scoring, other techniques, or combinations thereof. In some examples, the artificial intelligence framework 164 can be or include a machine-learning framework. Additional details regarding the use of a machine-learning framework are described in relation to FIG. 4, which is discussed infra.

The clinician computing device 170 can be a computing device used by a clinician. A clinician is a medical professional, such as a doctor. In an example, the clinician is a medical professional that provides care or supervision for the recipient. The clinician computing device 170 includes one or more software programs usable to monitor the implantable medical system 20 or to obtain data from the server 160 regarding the recipient.

One or more components of the system 10 can implement various methods, including the example method shown in FIG. 2.

Method

Figure 2A:
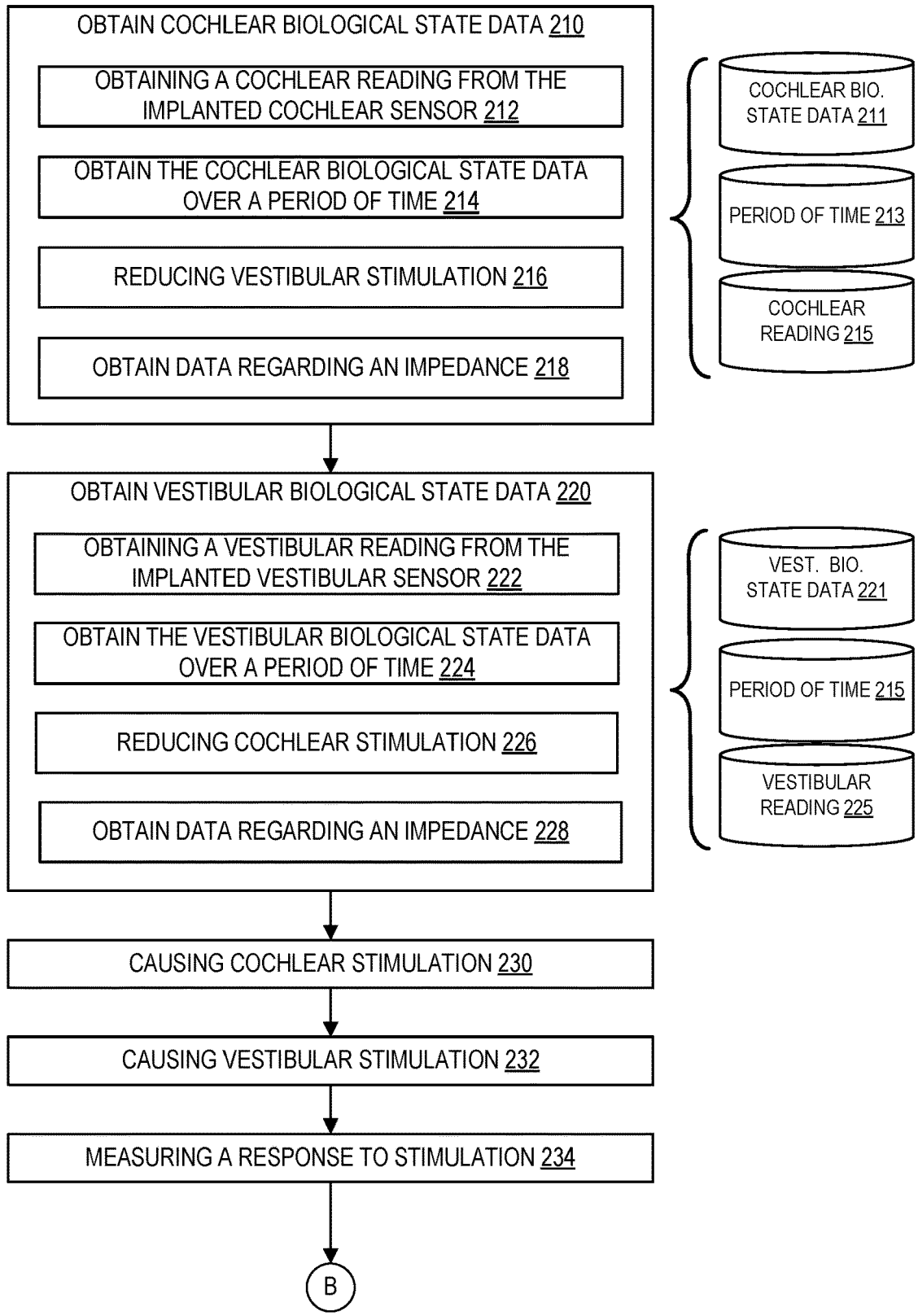
FIG. 2, which is made up of FIG. 2A and FIG. 2B, illustrates a first example method.
Figure 2B:
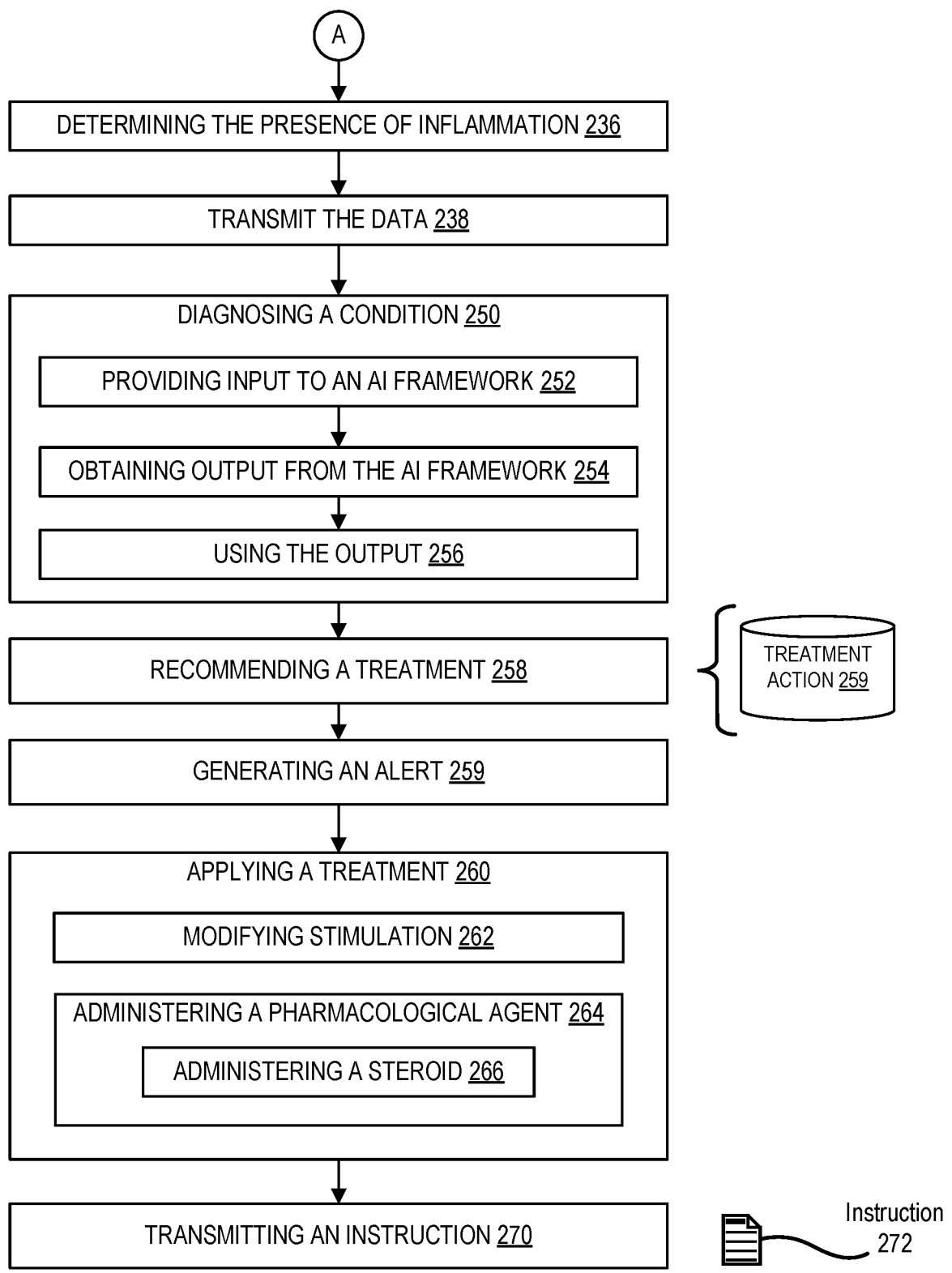

FIG. 2, which is made up of FIG. 2A and FIG. 2B, illustrates a first example method 200. The first example method 200 can be a method for monitoring a state of the recipient's cochleovestibular system and taking a treatment action based thereon. One or more of the operations of the method 200 can be performed at any of a variety of locations, such as at a residence, a clinic, or an operating room. One or more of the operations of the method 200 can be performed automatically, manually, or remotely. The method 200 can begin with operation 210.

Operation 210 can include obtaining cochlear biological state data 211. The cochlear biological state data 211 can be data regarding the biological state of the recipient's cochlea. The cochlear biological state data 211 can be obtained using any of a variety of different techniques. For example, the operation 210 can include obtaining cochlear biological state data 211 of a cochlea with an implanted cochlear sensor 126. In some examples, the implanted cochlear sensor 126 can be the cochlear electrode 128. Obtaining the cochlear biological state data 211 can include applying stimulation (e.g., with the cochlear electrode 128) and measuring a response (e.g., with the cochlear sensor 126. The obtaining can occur while one or both of the cochlear or vestibular simulation is reduced (see, e.g., operations 216 and 226, infra). Obtaining the cochlear biological state data 211 can include obtaining the data directly or via one or more intermediary devices. For example, while the cochlear biological state data 211 can be obtained using one or more sensors of the implantable medical device 102, the server 160 can obtain the data 211 via one or more intermediary components. In some examples, operation 210 can include operations 212, 214, 216, and 218.

Operation 212 can include obtaining a cochlear reading 213 from the implanted cochlear sensor 126. For example, the implanted cochlear sensor 126 can generate a signal indicative of an environment around the implanted cochlear sensor 126 and that signal can be the cochlear reading 213. The cochlear reading 213 can be initially obtained by the implanted medical device 102 and can then be transmitted to one or more other devices.

Operation 214 can include obtaining the cochlear biological state data 211 over a period of time 215. For example, the obtaining of the cochlear biological state data 211 can occur at any of a variety of different frequencies over the period of time 215. The period of time 215 can be on the order of hours, days, weeks, months, or years. In some examples, the obtaining includes obtaining the cochlear biological state data 211 at a beginning of the period of time 215 and then again at the end of the period of time 215. In other examples, multiple readings of the cochlear biological state data 211 can be obtained during the period of time 215.

Operation 216 can include reducing vestibular stimulation. For example, the operation 226 can include reducing the vestibular stimulation to a level below which may negatively affect the cochlear biological state data 211. In some examples, the reducing can include completely preventing vestibular stimulation while obtaining the cochlear reading 213. In some examples, the providing of stimulation during the obtaining of cochlear biological state data 211 can interfere with the obtaining of accurate cochlear biological state data 211, thus the vestibular stimulation within a period of time of obtaining the readings can be reduced so as not to have the vestibular stimulation negatively affect the readings. However, in other circumstances, the obtaining of the data can be configured to be within a certain amount of time of providing stimulation, such as to measure the recipient's response to the stimulation. Further, in some examples, the obtaining of the data is timed to be at a time where the reading will be substantially unaffected by stimulation. The reduction or cessation of stimulation can be unilateral or bilateral. Likewise, cochlear stimulation can be reduced or eliminated proximate in time to when the cochlear biological state data 211 is obtained. But there can be circumstances where cochlear stimulation is used to elicit a particular response that is recorded as useful data.

Operation 218 can include obtaining data regarding an impedance. For example, the operation 218 can include obtaining data regarding an impedance associated with stimulating the cochlea. The cochlear biological state data 211 or the vestibular biological state data 221 thus can include data regarding an impedance associated with cochlear or vestibular stimulation.

In some examples, a transimpedance is measured. The cochlear biological state data 211 or vestibular biological state data 221 (see operation 220, infra) can include a transimpedance matrix. A transimpedance matrix for the plurality of cochlear electrodes 128 of the cochlear carrier 124 can be measured. An example transimpedance matrix can has n columns and n rows, where n is the number of electrodes being measured. Each column and row can correspond to a particular cochlear electrode 128 of the cochlear carrier 124. The value of n can vary depending on the configuration of the cochlear carrier 124. All values, except the diagonal, of the transimpedance matrix can be empirically measured by stimulating each of a plurality of electrodes with a known current, one at a time. Then, the resulting voltage at each non-stimulated electrode is measured. Because voltage observed on the stimulating electrode includes parts from the bulk resistance and tissue impedance, the diagonal of the transimpedance matrix is not determined in this manner. Rather, the values along the diagonal of the transimpedance matrix can be estimated by linear extrapolation or interpolation of the values surrounding the diagonal values. In some examples, transimpedance measurements can be taken at vestibular electrodes 134 even where stimulation is provided by cochlear electrodes 128.

A transimpedance matrix can be measured in any of a variety of ways. In an example, polarity of current flow is used. In an example, monopolar stimulation is used, and in other examples a four-point impedance or alternative bipolar measurements can be used. Various routings of the current flow can be used. In another example, phase width timing is used. Transimpedance measurements can be taken at several points in time, ranging from the start of the first phase of a stimulation pulse to the end of the second phase of the stimulation pulse. In an example, multiple transimpedance matrices are measured, with a transimpedance matrix being measured at multiple times during a stimulation pulse (e.g., early in the pulse and late in the pulse). Such measurement can be useful in separating capacitive and resistive components, and therefore separate contact impedance contributions from tissue impedance contributions. In addition or instead, measuring the one or more transimpedance matrices can include measuring transimpedance matrices longitudinally (e.g., over a time period longer than a single stimulation pulse, such as daily, weekly, or monthly). Such longitudinal measurements can be used to track the evolution of data over time to facilitate monitoring for changes of monitored tissue.

When measuring on the stimulation contact, this configuration allows voltage buildup over the stimulating contact (contact impedance) to be characterized and separate the impedance component, due to the contact, from the impedance components relating to the flow of the current through the cochlear tissues and back to the reference electrode. In yet another example, stimulus intensity can be used. The contact impedance can be non-linear with current intensity, and the tissue resistivity can be linear. The use of stimulus intensity can facilitate separating a linear tissue component and a non-linear contact impedance component. The values of the measured transimpedance matrix can be affected by conditions of the stimulated tissue. Additional details and example implementations of obtaining a transimpedance matrix are described in U.S. Pat. No. 7,860,573, which is titled "Focused Stimulation in a Medical Stimulation Device" and which is hereby incorporated herein by reference for any and all purposes.

In some examples, the obtaining of the cochlear biological state data 211 can include obtaining data regarding a voltage profile. A voltage profile can be a measurement of voltage at one or more electrodes (e.g., the cochlear electrodes 128 or the vestibular electrodes 134) in response to the application of current at one or more of the other cochlear electrodes 128, such as a result of generating a current flow path to stimulate tissue. For example, the voltage profile can reflect the voltage created at different nerve regions of the tissue (e.g., "tissue voltage") at a plurality of locations proximate electrodes 128 in response to current delivered to a particular electrode 128. In an example implementation, the cochlear carrier 124 has twenty-two cochlear electrodes 128, and current delivered by electrode eleven can spread over a potentially wide spatial extent of neighboring tissue regions. This current spread may extend, for example, to nerve regions proximate distant electrodes 128. As a result, the voltage profile can indicate voltage not only proximate the eleventh electrode 128, but also proximate other electrodes 128, including, in some examples, the vestibular electrodes 134. In the example, the stimulating voltage would typically be strongest proximate the eleventh electrode 128 and gradually decline proximate other electrodes 128. The voltage profiles for the implantable medical device 102 can vary over time and biological conditions within the cochlea can affect the voltage profiles. Example voltage profiles are shown and described in relation to FIGS. 1 and 2 of U.S. Pat. No. 7,860,573, which was previously incorporated by reference.

In some examples, obtaining the cochlear biological state data 211 can include obtaining action potential data generated by a stimulated nerve. Evoked compound action potentials are neural responses to stimulation. Nerve cells that are activated by electrical stimulation can emit an action potential a shortly after receiving the stimulus. This biological response is recordable by the implantable medical device 102. The obtaining of the cochlear biological state data 211 can include obtaining neural response telemetry regarding electrical field that reaches the auditory nerve. In an example, the neural response data can be obtained using a measurement of evoked neural response technique described in U.S. Pat. No. 8,454,529, which is titled "Minimization of Electrical Stimulus Artifact during Measurement of Evoked Neural Response" and which is hereby incorporated by reference in its entirety for any and all purposes.

In some examples, obtaining the cochlear biological state data 211 can include performing electrocochleography. In such an example, the implantable medical device 102 includes an acoustic component (e.g., a speaker) that sends a signal and a response is recorded.

Following operation 210, the flow of the method 200 can move to operation 220.

Operation 220 can include obtaining vestibular biological state data 221. For example, the operation 220 can include obtaining vestibular biological state data 221 of a vestibular system with an implanted vestibular sensor 132. In some examples, the implanted vestibular sensor 132 can be the vestibular electrode 134. Obtaining the vestibular biological state data 221 can include applying stimulation (e.g., with the vestibular electrode 134) and measuring a response (e.g., with the vestibular sensor 132). Obtaining the vestibular biological state data 221 can include obtaining the data directly or via one or more intermediary devices. The obtaining can occur while one or both of the cochlear or vestibular simulation is reduced (See, e.g., operations 216, 226). In some examples, operation 220 can include operations 222, 224, 226, and 228.

Operation 222 can include obtaining a vestibular reading 225 from the implanted vestibular sensor 132. For example, the implanted vestibular sensor 132 can generate a signal indicative of an environment around the implanted vestibular sensor 132 and that signal can be the vestibular reading 225. The vestibular reading 225 can be initially obtained by the implanted medical device 102 and can then be transmitted to one or more other devices.

Operation 224 can include obtaining the vestibular biological state data 221 over a period of time 223. For example, the obtaining of the vestibular biological state data 221 can occur at any of a variety of different frequencies over the period of time 223. The period of time 223 can be on the order of hours, days, weeks, months, or years. In some examples, the obtaining includes obtaining the vestibular biological state data 221 at a beginning of the period of time 223 and then again at the end of the period of time 223. In other examples, multiple readings of the vestibular biological state data 221 can be obtained during the period of time 223. The period of time 223 can be the same as or different from the period of time 215 discussed above with respect to the cochlear biological state data 211.

Operation 226 can include reducing cochlear stimulation. Operation 226 can include reducing cochlear stimulation. For example, the operation 226 can include reducing the cochlear stimulation to a level below which may negatively affect the vestibular biological state data 221. In some examples, the reducing can include completely preventing cochlear stimulation while obtaining the vestibular reading 213. In some examples, the reducing can include completely preventing cochlear stimulation while obtaining the vestibular reading 223. In some examples, the providing of stimulation during the obtaining of biological state data can interfere with the obtaining of accurate biological state data, thus the vestibular stimulation within a period of time of obtaining the readings can be reduced so as not to have the cochlear stimulation negatively affect the readings. The reduction or cessation of stimulation can be unilateral or bilateral. The obtaining of the data can be configured to be within a certain amount of time of providing stimulation, such as to measure the recipient's response to the stimulation. Further, in some examples, the obtaining of the data is timed so as to be at a time where the reading will be substantially unaffected by stimulation. Likewise, the vestibular stimulation can be reduced or eliminated during the obtaining of the vestibular biological state data. But there can be circumstances where cochlear stimulation is used to elicit a particular response that is recorded as useful data.

Operation 228 can include obtaining data regarding an impedance. For example, operation 228 can include obtaining data regarding an impedance associated with stimulating the vestibular system. In some examples, a transimpedance is measured. The vestibular biological state data 221 can include a transimpedance matrix. A transimpedance matrix for the plurality of vestibular electrodes 134 of the vestibular carrier 130 can be measured. An example transimpedance matrix can have has m columns and m rows, where m is the number of vestibular electrodes 134. Each column and row can correspond to a particular vestibular electrode 134 of the vestibular carrier 130. The value of m can vary depending on the configuration of the vestibular carrier 130. All values, except the diagonal, of the transimpedance matrix can be empirically measured by stimulating each of a plurality of vestibular electrodes 134 with a known current, one at a time. In some examples, transimpedance measurements can be taken at cochlear electrodes 128 even where stimulation is provided by cochlear electrodes 128. Additional details regarding transimpedance measurements are described above in relation to operation 218.

In some examples, obtaining the vestibular biological state data 221 can include obtaining action potential data generated by a stimulated nerve, such as the stimulated vestibular nerve.

In some examples, the obtaining of the vestibular biological state data 221 can include obtaining data regarding a voltage profile. A voltage profile can be a measurement of voltage at one or more electrodes (e.g., the cochlear electrodes 128 or the vestibular electrodes 134) in response to the application of current at one or more of the vestibular electrodes 134, such as a result of generating a current flow path to stimulate vestibular tissue. For example, the voltage profile can reflect the voltage created at different nerve regions of the tissue (e.g., "tissue voltage") at a plurality of locations proximate vestibular electrodes 134 in response to current delivered to a particular vestibular electrode 134. In an example implementation, the vestibular carrier 130 has two electrodes 134, and current delivered by one electrode 134 can spread over a potentially wide spatial extent of neighboring tissue regions. This current spread may extend, for example, to nerve regions proximate distant electrodes 134, even in some examples, the cochlear electrodes 128. The voltage profiles for the implantable medical device 102 can vary over time and biological conditions within the cochlea can affect the voltage profiles. Example voltage profiles are shown and described in relation to FIGS. 1 and 2 of U.S. Pat. No. 7,860,573, which is titled "Focused Stimulation in a Medical Stimulation Device" and which was previously incorporated by references in its entirety for any and all purposes.

As described above (and below at least in association with operation 310), various operations described herein relate to the obtaining of data (e.g., cochlear biological state data 211 and vestibular biological state data 221). The data can be obtained periodically, directly, or indirectly. The sensor data can take any of a variety of different forms depending on the configuration of the sensor that produced the sensor data. Further, the form and character of the sensor data can change as the sensor data is used and moved throughout the system 10. For example, sensor data can begin as a real-time analog signal that is converted into a real-time digital signal within a sensor, which is then transmitted in real-time as packets of data to an application for batch sending (e.g., non-real-time) to another device (e.g., the server 160). Additionally, the sensor data can be processed as the sensor data are used and moved throughout the system 10. For instance, the sensor data can be converted into a standardized format and have relevant metadata attached (e.g., timestamps, sensor identifiers, etc.).

Operation 230 can include causing cochlear stimulation of the cochlea. For example, the operation 230 can include applying the cochlear stimulation with the cochlear electrode 128. As discussed above, the one or more processors 116 and the stimulation source 118 of the implantable medical device 102 can cause stimulation via the one or more cochlear electrodes 128. For example, the operation can include obtaining, with the one or more processors 116, sound signals and generate output signals based thereon for use in stimulating a recipient's auditory system via the cochlear electrodes 128. In some examples, the operation 230 can further include performing sound processing and coding operations to convert input audio signals into output signals used to provide stimulation via the one or more cochlear electrodes 128. Non-limiting examples of generating cochlear stimulation techniques (including those based on received sound signals) are described in U.S. Pat. Nos. 7,561,709; 7,231,257; and 9,084,893, which are hereby incorporated by reference in their entirety for any and all purposes. In some examples, some or all of the cochlear stimulation can be specifically configured as part of obtaining data. For example, the stimulation can be a test stimulation configured to be a stimulation that causes a response by tissue or to obtain certain data. For instance, certain cochlear stimulation can be generated without respect to a sound input signal.

Operation 232 can include causing vestibular stimulation of the vestibular system. In some examples, the operation 232 includes applying the vestibular stimulation with one or more of the vestibular electrodes 134. In some examples, the operation 232 can include providing therapeutic vestibular stimulation. The therapeutic vestibular stimulation can be stimulation configured to inhibit the functioning of the recipient's vestibular system, to cause the recipient to experience a vestibular percept, or both. As discussed above, the one or more processors 116 and the stimulation source 118 of the implantable medical device 102 can cause stimulation via the one or more vestibular electrodes 134. For example, the operation can include obtaining, with the one or more processors 116, balance signals (e.g., output from one or more accelerometers or gyroscopes) and generate output signals based thereon for use in stimulating a recipient's vestibular system via the vestibular electrodes 134. In some examples, the operation 232 can further include performing processing and coding operations to convert balance signals into output signals used to provide stimulation via the one or more vestibular electrodes 134. Additional examples of providing vestibular stimulation are described in relation to European Patent Application No. 19382629.4 and European Patent Application No. 19382632.8, both of which were filed on Jul. 24, 2019, and are hereby incorporated by reference in their entirety for any and all purposes.

At least some of the vestibular stimulation can be specifically configured as part of obtaining data. For example, the stimulation can be a test stimulation configured to be a stimulation that causes a response by tissue or to obtain certain data.

Operation 234 can include measuring a response to stimulation. For example, the response can be a neural response or a myogenic response to electrical stimulation (e.g., as provided by the cochlear electrode 128 or the vestibular electrode 134). A sensor, such as an accelerometer or gyroscope, can measure the myogenic response. In examples, measuring the response includes measuring action potential data generated by a stimulated nerve, which is described in more detail above.

Operation 236 can include determining the presence of inflammation. For example, the operation 236 can include determining that one or both of the cochlear biological state data 211 and the vestibular biological state data 221 indicates presence of inflammation in one or both of the cochlea and vestibular system. Further, the operation 236 can include determining not only the presence of inflammation but also the extent of inflammation.

Any of a variety of techniques can be used to determine the presence of inflammation. In an example, relevant parameters can be extracted from the cochlear biological data biological state data 211 and the vestibular biological state data 221. The data 211, 221 and other relevant parameters can be analyzed by, for example, a classification algorithm that has been tuned or trained based on training sets of cases where inflammation occurred versus standard cases with no inflammation. In some examples, the classification algorithm is a thresholding algorithm that determines whether one or more values of the data 211, 221 satisfy a threshold (e.g., by comparing the one or more values to one or more thresholds). If so, inflammation formation is detected. In other examples, the classification algorithm can take the form of a decision tree or neural network that receives the data 211, 221 and one or more additional parameters. Further still, statistical analyses of one or more aspects of the data 211, 221 can be performed to determine the presence of inflammation.

Operation 238 can include transmitting data. For example, the operation 238 can include transmitting the cochlear biological state data 211 and the vestibular biological state data 221 to another device (e.g., a mobile consumer device or a server). For example, the implantable medical device 102 can transmit the data 211, 221 to the external medical device 106 using the transceiver. The implantable medical device 102 can transmit the data 211, 221 to the recipient computing device 140. The recipient computing device 140 can transmit the data 211, 221 to the server 160 or the clinician computing device 170 via the network 30.

Operation 250 can include diagnosing a condition. For example, the operation 250 can include diagnosing a condition of the cochlea or the vestibular system based on both the cochlear biological state data 211 and the vestibular biological state data 221. Example conditions that may be diagnosed include an infection, inflammation, or a balance issue. In some examples, the condition is a condition that affects other body systems than the vestibular system or cochlear system. For instance, the condition can be a condition primarily affecting or originating from another portion of the body but has effects detected by techniques described herein. For instance, blood pressure variations, irregular heart rhythms, or other conditions may be detectable in the recipient's cochleovestibular system. The diagnosing of the condition characteristics can use the "raw" data 211, 221. In addition or instead, the determining can be based on derived features from the data 211, 221. In a first approach, statistics (e.g., statistics relating to impedance data for electrodes) can be used to implement thresholds for separating normally functioning electrodes from those affected by a condition (e.g., an infection). In an example, a threshold of one or more values of the data 211, 221 can be used to determine the presence of absence of an infection or another condition. For instance, responsive to one or more values of the data 211, 221 satisfying a threshold, the presence or absence of a condition can be determined. The parameters can be combined non-linearly. For instance, a decision tree can be used. In another example, a probabilistic graphical model is used. In some examples, a neural network can be used. Operation 250 can include operations 252, 254, and 256.

Operation 252 can include providing input to an artificial intelligence framework 164. For example, the operation can include providing the cochlear biological state data 211 and the vestibular biological state data 221 as input into the artificial intelligence framework 164. In addition or instead, parameters derived from the data 211, 221 can be provided as input to the artificial intelligence framework 164. For example, where the presence (or absence) of inflammation is detected in operation 236, the determination can be used as input into the artificial intelligence framework 164. In some examples, the data 211, 221 can be processed to fit a format used by the artificial intelligence framework 164. Operation 254 can include obtaining an output from an artificial intelligence framework. For example, the output can be output responsive to the cochlear biological state data 211 and the vestibular biological state data 221 being at least some of the input into the artificial intelligence framework. In an example, the resulting output can be a value expressing a confidence that the data 211, 221 indicates a condition (e.g., the confidence can be expressed as a value between 0 and 1). Operation 256 can include using the output of the artificial intelligence framework. For example, the output can be used in diagnosing the condition, in deciding treatment, or in controlling treatment. In some examples, there can be more than one artificial intelligence framework that is used. For example, there can be one or more artificial intelligence frameworks configured to determine whether input indicates the presence of an inflammatory condition, while one or more other artificial intelligence frameworks can be configured to determine whether the input indicates the presence of a different condition. The artificial intelligence framework 164 is described in more detail in FIG. 4, infra.

Operation 258 can include recommending a treatment action 259. The treatment action 259 can be an action ameliorating the condition. In an example, the treatment action 259 includes reporting the condition to a clinician or caregiver (e.g., to help guide treatment). For example, a recommendation for a treatment action 259 can be provided to the clinician by sending a message to the clinician's computing device 170. In another example, the recommendation can be for the recipient to schedule an appointment with the clinician. The operation 258 can be performed responsive to diagnosing the condition. In some examples, if no condition is diagnosed or if the condition is not sufficiently severe, then it may be determined that no treatment action 259 is recommended to be performed. If a condition exists, then one or more treatment actions 259 can be selected and performed. Determining whether to perform a treatment action 259 and what treatment action 259 to perform (if any) can be accomplished in any of a variety of ways. In examples, the determining can be performed using a decision tree, one or more thresholds, a heuristic technique, other techniques, or combinations thereof. For example, the determining can include determining an extent to which the condition affects the health of the recipient. Then, based on the extent, any of a variety of treatment actions 242 can be performed.

Operation 259 can include generating an alert. For example, operation 259 can include generating an alert indicating a potential issue with the recipient's vestibular system or the recipient's cochlea based on both the cochlear biological state data 211 and the vestibular biological state data 221. For example, the device performing the operation 259 (e.g., the implantable medical device 102, the recipient computing device 140, the server computing device 160, or the clinician computing device 170) can transmit or otherwise provide an alert to the clinician, the recipient, a caregiver, or another person indicating that the recipient has or may have a condition. Where the alert is directed to the recipient or the caregiver, then the alert can direct that person to contact the clinician. Where the alert is directed to the clinician, the alert can indicate to contact the recipient due to a potential issue.

Operation 260 can include applying the treatment. For example, the operation 260 can include taking the treatment action 259. In examples, operation 260 can include operation 262 and operation 264.

Operation 262 can include modifying stimulation. For example, the operation 262 can include modifying a stimulation provided to the vestibular system or the cochlea. The operation 262 can be performed responsive to diagnosing the condition. In some examples, modifying the stimulation can include modifying provided stimulation parameters to account for the condition. For example, it can be determined that the condition affects the performance of the implantable medical device 102 or the recipient's cochlear or vestibular system and the treatment action 259 can include modifying the performance of the implantable medical device 102 to ameliorate the effects of the condition or to prevent damage to the recipient as a result of the condition. For example, the condition can severely affect the recipient's vestibular system such that additional or different stimulation would be more beneficial.

Modifying the performance of the implantable medical device 102 can include modifying parameters to affect ongoing operation of the implantable medical device 102. In an example, cochlear stimulation parameters can be modified to have a different threshold level parameter or a comfort level parameter. The threshold level relates to a level of stimulation that needs to be provided to reach the recipient's threshold of hearing. The comfort level relates to a highest level of stimulation to be provided that is within a threshold of comfort for the recipient. In an example, vestibular stimulation parameters can include a frequency or intensity of stimulation. For example, in some implementations, vestibular stimulation has a lasting effect and is provided periodically such that new stimulation is provided as the prior stimulation is about to wear off. In some examples, the length of time that the effect of stimulation lasts can decrease over time and the frequency of stimulation can be increased to address the change. Additional parameters for vestibular and cochlear stimulation can include, auto pulse width selection parameters, electrode selection parameters, or multipolar configuration selection parameters. The treatment action 259 can include, for example, rerouting current flow for better cochlear or vestibular access, such as by changing an amount of electrodes used in stimulation (e.g., changing among monopolar, bipolar, and multi-polar stimulation).

Operation 264 can include administering a pharmacological agent. For example, the operation can be performed responsive to diagnosing the condition. Operation 264 can include operation 266. Operation 266 can include administering a steroid. For example, the steroid can be administered responsive to diagnosing the condition. In an example, the treatment action 259 includes the application of a therapy to the recipient to affect the condition. For example, the therapy can be selected to reduce or prevent future spread of the condition (e.g., from the vestibular system or cochlear system to the other system). Such a therapy can include, pharmacological intervention, such as providing a therapeutically-effective amount of an anti-inflammatory drug to the recipient. In some examples, the implantable medical device 102 itself can be configured to provide a drug, such as by having a drug eluding material. In additional examples, the implantable medical device 102 can include a drug-delivery pump or other mechanism that can be selectively activated to deliver drugs in response to detecting the condition. An example of such a delivery system is described in WO 2019/073348, which is entitled "Clinical-based Automated Delivery of Treatment Substances to the Inner Ear", and which is hereby incorporated by reference herein in its entirety for any and all purposes. During or after the providing of the treatment action 259, the condition can be monitored (e.g., using techniques described herein), such as whether and to what extent the treatment action 259 is affecting the condition.

Operation 270 can include transmitting an instruction 272. The instruction 272 can be configured to, for example, apply a treatment modification to the implanted stimulator. For example, the operation 270 can include transmitting the instruction to the implantable medical device 102. The transmitting can be performed via one or more intermediary devices.

Method

Figure 3A:
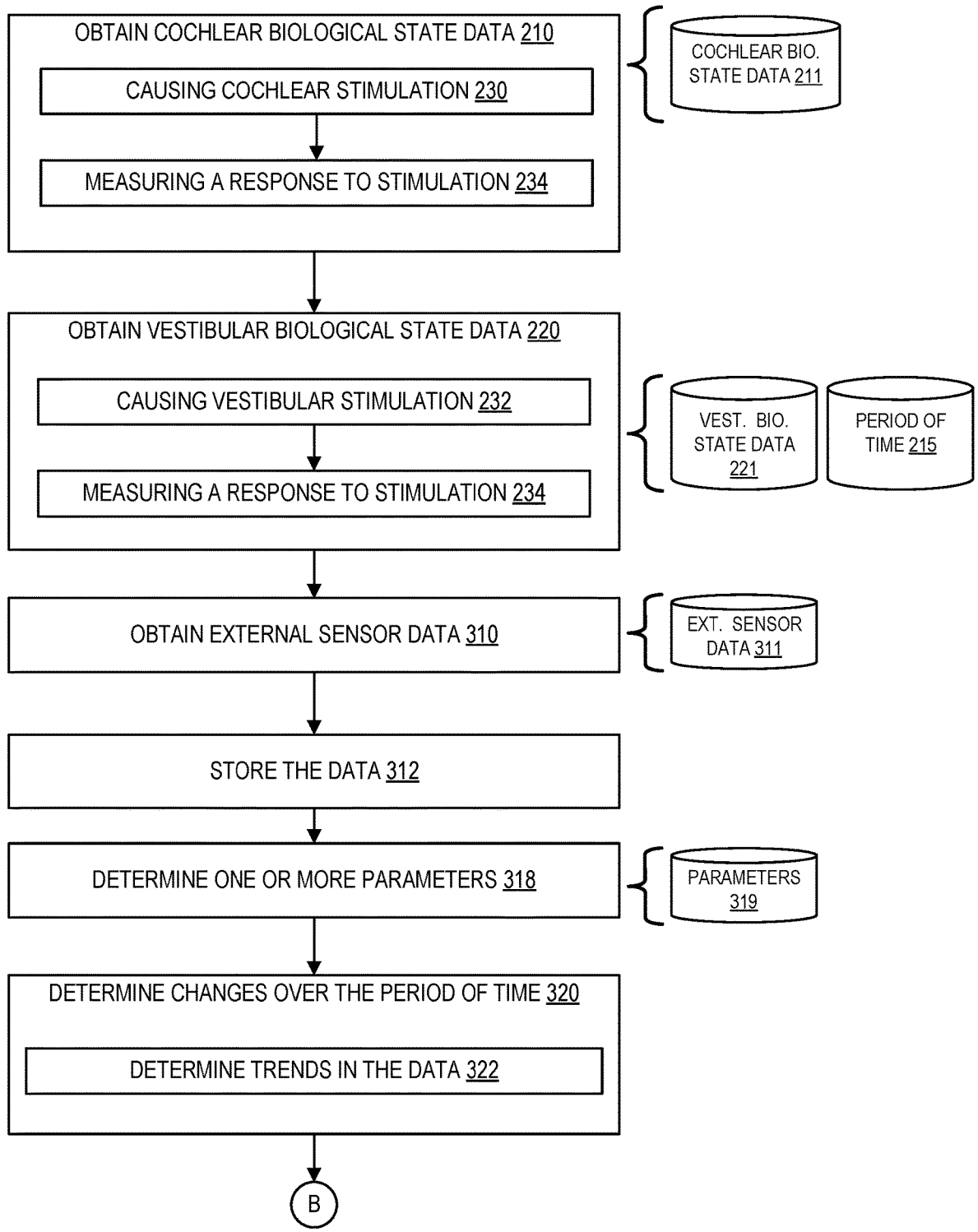
FIG. 3, which is made up of FIG. 3A and FIG. 3B, illustrates a second example method.
Figure 3B:
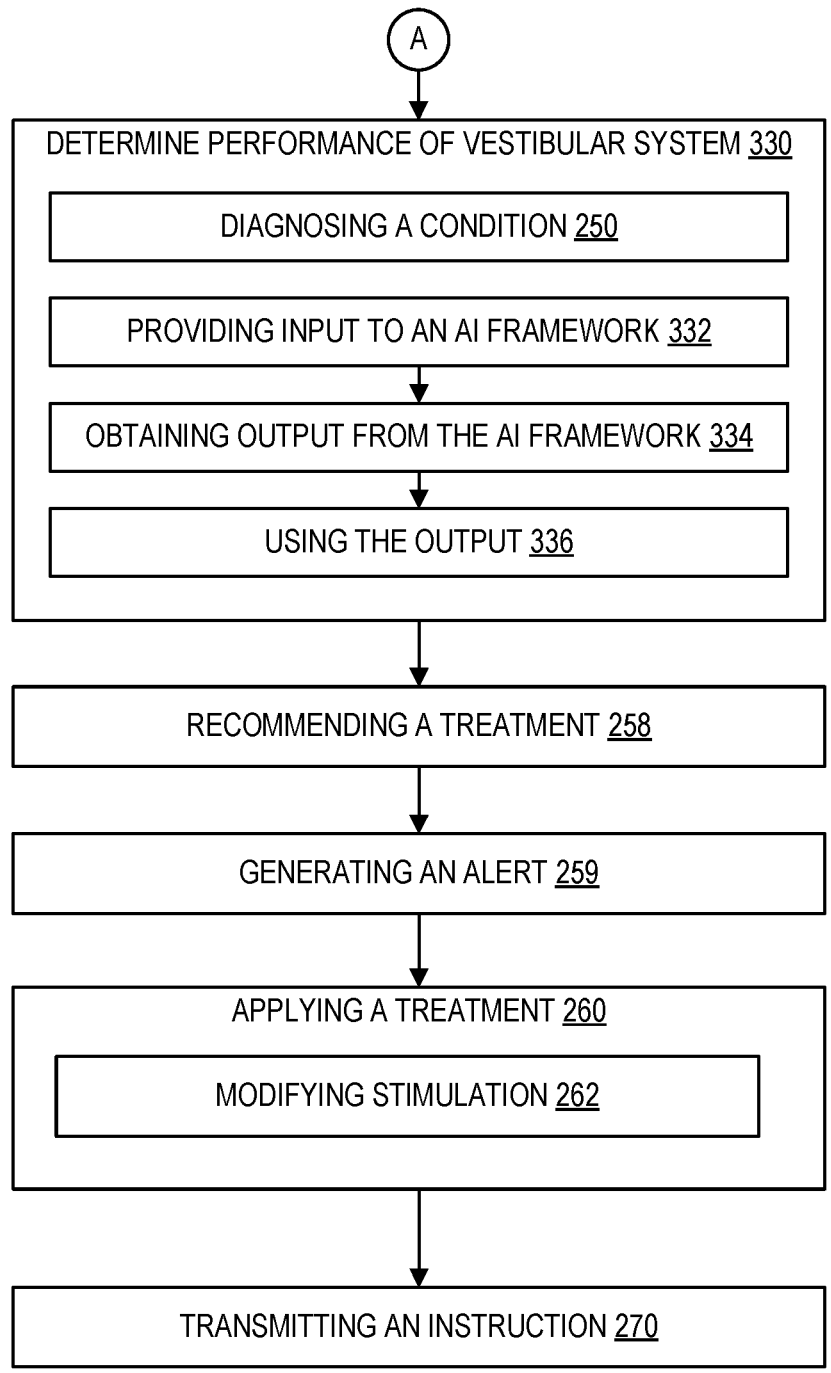

FIG. 3, which is made up of FIG. 3A and FIG. 3B, illustrates a second example method 300.

The method 300 can include one or more operations as described above in relation to the method 300. As illustrated, the method can include operations 210, 220, 230, 232, and 234. Operation 210 can include obtaining cochlear biological state data. For example, this operation can include one or more aspects of operation 210 as described above. Operation 220 can include obtaining vestibular biological state data 221. For example, the operation can include operation 232 and operation 234. In some examples, obtaining the vestibular biological state data 221 can include data regarding an impedance associated with stimulating the vestibular system of the recipient. The operations 220, 230, 232, 234 can include one or more aspects of operations 220, 230, 232, and 234 as described above. The operation 220 can include obtaining, over a period of time 215, vestibular biological state data 221 with a vestibular device of a recipient (e.g., via an implanted vestibular sensor 132 thereof). Operation 230 can include causing cochlear stimulation. Operation 232 can include causing vestibular stimulation. For example, the vestibular stimulation can be caused with a vestibular electrode 134. Operation 234 can include measuring a response to stimulation. For example, the operation 234 can include measuring a response to the vestibular stimulation. The response can be stored as part of the vestibular biological state data 221 or the external sensor data 311 described below. The response to stimulation can be, for example, data regarding a neural or myogenic response to electrical stimulation.

Operation 310 can include obtaining external sensor data 311. For example, the operation 310 can include obtaining, over the period of time 215, external sensor data 311 with one or more external devices associated with the recipient. In some examples, the period of time 215 can be greater than one day. In some examples, the external sensor data 311 includes accelerometer data from at least two different devices. For example, the obtaining of the external sensor data 311 can occur at any of a variety of different frequencies over the period of time 215. The period of time 215 can be on the order of hours, days, weeks, months, or years. In some examples, the obtaining includes obtaining the external sensor data 311 at a beginning of the period of time 215 and then again at the end of the period of time 215. In other examples, multiple readings of the external sensor data 311 can be obtained during the period of time 215.

In examples, the operation 310 can include receiving movement data from one or more wearable accelerometers or gyroscopes. In some examples, the operation 310 can include obtaining location data. In an example, location data can include satellite-based location data (e.g., GPS-based location data) generated by the recipient computing device 140. In another example, the location data is based on nearby wireless broadcasts, such as WI-FI SSIDs (Service Set Identifiers). Such wireless broadcasts can be useful for determining a current location as well as a current location type. For instance, while the implantable medical system 20 is operating in gym, the recipient computing device 140 may detect a WI-FI SSID called "Gym Wi-Fi", which can be used as an indication that the recipient is at a gym. In another example, the location data can be determined based on the recipient manually or automatically checking-in at a location (e.g., using the recipient computing device 140

In some examples, the external sensor 108 can be a component for obtaining input from a user (e.g., a touchscreen, keyboard, mouse, wand, microphone, or other component). The external sensor data 311 can include data provided by the recipient or a caregiver, such as information provided in response to a query provided by the system 10. For example, the medical device application 142 can cause a display of the recipient computing device 140 to ask the user to rate their ability to balance or ask the user about the kind of activity they are currently engaged in. The user can then provide a response over the component (e.g., via a touchscreen) and the response can be included as part of the external sensor data 311.

In some examples, the obtaining of data of operations 210, 220, and 310 can be in response to the recipient being prompted to perform one or more tasks. In some examples, obtaining the external sensor data 311 can include obtaining data that is the result of a test performed in a clinic. For example, data can be obtained during a posturography test performed by or on the recipient. For instance, the posturography test can include the recipient attempting to balance on a foam mat or another unstable surface. Sensor data can be obtained while the recipient is subjected to the test. In some examples, the data includes observations of a clinician or accelerometer data that measures the extent of the recipient's sway or wobble. In some examples, eye movement can be monitored and the movement of the eye (e.g., eyes flashing left or right) can be used as an indication of the recipient's ability to balance. In some examples, the data can be tagged with metadata describing, for example, that it was obtained during the performance of a particular test.

Operation 312 can include storing the data. For example, the operation 312 can include storing 312 the obtained implanted vestibular biological state data 221 and external sensor data 311. In some examples, the data is stored as part of the data store 162 of the server 160. In some examples, certain of the data is excluded from storage or is not used by later operations. For example, certain data may be produced that is irrelevant or potentially error prone. Data produced by unworn sensors can be ignored or excluded from storage. In some examples, data can be combined. For instance, multiple different sensors can produce step count data and the data can be processed to produce combined step count data (e.g., by averaging existing data or by filtering out outlier data).

Operation 318 can include determining one or more parameters 319. One of the parameters 319 can be the recipient's stability when standing. Determining the stability while standing can be determined automatically by determining when the user is believed to be standing (e.g., based on the obtained data) and to measure an amount and nature of the movement by the recipient while standing (e.g., using an accelerometer or gyroscope).

One of the parameters 319 can be the recipient's stability of gait when walking. Determining the stability of gait when walking can be determined automatically by determining when the user is believed to be walking (e.g., based on the obtained data) and to measure an amount and nature of the movement by the recipient. In some examples, the recipient can be determined to be walking based on the recipient logging a walk on an activity tracker. In some examples, the recipient can be determined to be walking based on the recipient being detected to be moving at a particular speed consistent with walking.

One of the parameters 319 can be the recipient's consistency of gait when walking. Determining the stability of gait when walking can be determined automatically by determining one or more characteristics of the recipient's gait while walking and performing statistical analysis to determine how consistent those characteristics are over time. For example, the number of steps that a recipient takes can be measured, as well as the recipient's stride. In some examples, an amount of lateral movement of the recipient can be determined.

One of the parameters 319 can be a time that it takes the recipient to stand from a sitting position. One of the parameters 319 can be a time it takes the recipient to sit from a standing position. The time to go from sitting to standing or vice versa can be determined based on detecting transition points between sitting and standing and timing how long the transition takes. Transitioning can be determined based on particular movement by the recipient consistent with movement of one transitioning from sitting to standing or vice versa.

One of the parameters 319 can be a percent of time in a day the recipient is walking. One of the parameters 319 can be a percent of time in a day the recipient is standing One of the parameters 319 can be a percent of time in a day the recipient is sitting. One of the parameters 319 can be a percent of time in a day the recipient is lying prone. The percentage of time that the user spends in various states can be determined based on classifying what the recipient is doing (e.g., lying prone, sitting, standing, or walking) and then determining how long the recipient sends performing those actions.

One of the parameters 319 can be the recipient's count, severity, regularity or trend of falls or stumbles. Falls or stumbles can be determined based on particular sensor data indicating a kind of movement consistent with falls or stumbles (e.g., sharp acceleration or deceleration).

One of the parameters 319 can be the recipient's walking speed or acceleration. One of the parameters 319 can be the recipient's walking distance. One of the parameters 319 can be the recipient's time in walking up or down stairs. One of the parameters 319 can be the recipient's stability in walking up or down stairs. A person experiencing vestibular dysfunction may have a particularly difficult time traversing stairs, steps, or other changes in elevation. Thus, one or more parameters relating to traversing such terrain can be useful in identifying potential vestibular deficiencies even if a recipient is able to relatively easily move on even terrain. Other parameters 319 can be used.

The determination of the one or more parameters 319 can be based on artificial intelligence models (e.g., artificial intelligence framework 164). For example, there can be one more artificial intelligence models configured to determine one or more of the parameters based on the obtained data.

The parameters 319 can be tracked over time, which can identify episodes of balance instability that can be identified and tracked over time.

Operation 320 can include determining changes over a period of time. The operation 320 can include determining changes in one or both of the vestibular biological state data 221 the external sensor data 132 over the period of time. In addition or instead, the changes can be changes in the parameters 319 over time.

In some examples, the operation 320 includes to compare vestibular biological state data 221 obtained at a beginning of the period of time with vestibular biological state data 221 obtained at an end of the period of time. In some examples, the operation 320 can include determining changes in one or both of the vestibular biological state data 221 and the external sensor data over the period of time includes to compare external sensor data obtained at a beginning of the period of time with external sensor data obtained at an end of the period of time.

Operation 322 can include monitoring trends in data. For example, the operation 322 can include monitoring one or more trends in the obtained implanted vestibular biological state data 221 and external sensor data 311. For example, a statistical analysis can be performed to determine the trends.

Operation 330 can include determining a performance of a vestibular system. For example, the operation 330 can include determining a performance of the vestibular system of the recipient based on the changes. The performance of the recipient's vestibular system can be determined based on the one or more parameters 319. The performance of the recipient's vestibular system can be determined based on the one or more trends determined in operation 322. Certain trends can indicate a decline in the recipient's vestibular function, such as less stability in performing activities, less time spend performing activities that require movement, activities taking a longer time to perform, decreased movement speed, and increased incidence or severity of falls or stumbles. Further, the performance of the recipient's vestibular system can be determined based on indications of a condition of the recipient's vestibular system using the techniques described above in relation to FIG. 2. In examples, the performance of the vestibular system of the recipient can be the performance of the recipient's balance system overall. In addition or instead, the performance of specific sides of the recipient's vestibular system can be determined. For instance, the recipient's left side vestibular system can be evaluated compared to the recipient's right side vestibular system. Differences between the sides can be determined based on, for example, measures taken from implanted sensors proximate the particular side. In some examples, a potential issue can be further isolated to a particular portion of the recipient's vestibular system. In further examples, where the recipient already has bilateral vestibular stimulation, stimulation parameters can be modified for left and right sides (e.g., even turning off stimulation on one side or another), which can be used to identify which side has a vestibular deficiency.

In some examples, determining the performance of the vestibular system includes determining whether the recipient's risk or likelihood of falling is greater than a particular threshold. Responsive to the determining, the system 10 can make recommendations to the recipient to decrease their risk of falling.

In some examples, operation 330 can include operation 250, operation 332, operation 334, and operation 336.

Operation 250 can include diagnosing a condition, such as is described above. The diagnosing of the condition can further take into account the data collected during method 300 as well as other aspects thereof.

Operation 332 can include providing input to an artificial intelligence framework 164. For example, operation 332 can include providing the external sensor data 311 and the vestibular biological state data 221 as input into an artificial intelligence framework. Additional data can be provided, such as one or more of the parameters 319. Operation 334 can include obtaining output form the artificial intelligence framework. The output can be indicative of the functioning of the recipient's vestibular system. Operation 336 can include using the output. For example, the operation 336 can include using the output from the artificial intelligence framework in determining the performance.

In some examples, the parameters 319 can be used based on a comparison between an expected parameter value and the actual parameter 319. The expected parameter value can be determined based on parameters obtained from individuals having properly functioning vestibular systems. In some examples the expected parameters can be obtained based on values from individuals that are of similar ages or engaging in certain activities. For example, a recipient's stability while walking can be very different depending on the activity the recipient is engaging in. For instance, the stability of the recipient walking on uneven terrain or while sitting in a boat would be expected to be different from the stability of the recipient walking on even terrain or sitting at home. Such data can be taken into account during the determining of the performance of the recipient's vestibular system. Further, a recipient bending over to tie their shoes can be different from the recipient being unstable.

In some examples, one or more of the parameters 319 or other data can provide an indication of a change in activity by the recipient. For example, the recipient becoming more or less sedentary can indicate a relative level of vestibular functioning. The recipient performing activities that the recipient had ceased doing can indicate a relative level of vestibular functioning (e.g., an improvement).

Operation 258 can include recommending a treatment. For example, this operation can include one or more aspects of operation 258 as described above. In some examples, the operation 258 recommending a treatment responsive to determining the performance of the vestibular system of the recipient. In some examples, the treatment can relate to vestibular stimulation therapy for the recipient. In some examples, the treatment can be a recommendation that the recipient have a vestibular implant system implanted.

Operation 259 can include generating an alert. For example, this operation can include one or more aspects of operation 259 as described above.

Operation 260 can include applying a treatment. For example, this operation can include one or more aspects of operation 260 as described above. In some examples, operation 260 can include applying a treatment responsive to determining the performance of the vestibular system of the recipient. Operation 260 can include operation 262.

Operation 262 can include modifying stimulation. For example, operation 262 can include modifying a stimulation provided to the vestibular system responsive to determining the performance.

Operation 270 can include transmitting an instruction. For example, this operation 270 can include transmit an instruction to an implanted medical device 102 of the recipient via one or more intermediary devices, wherein the instruction is configured to apply a treatment modification to the implanted medical device 102.

Example Artificial Intelligence Model

Figure 4:
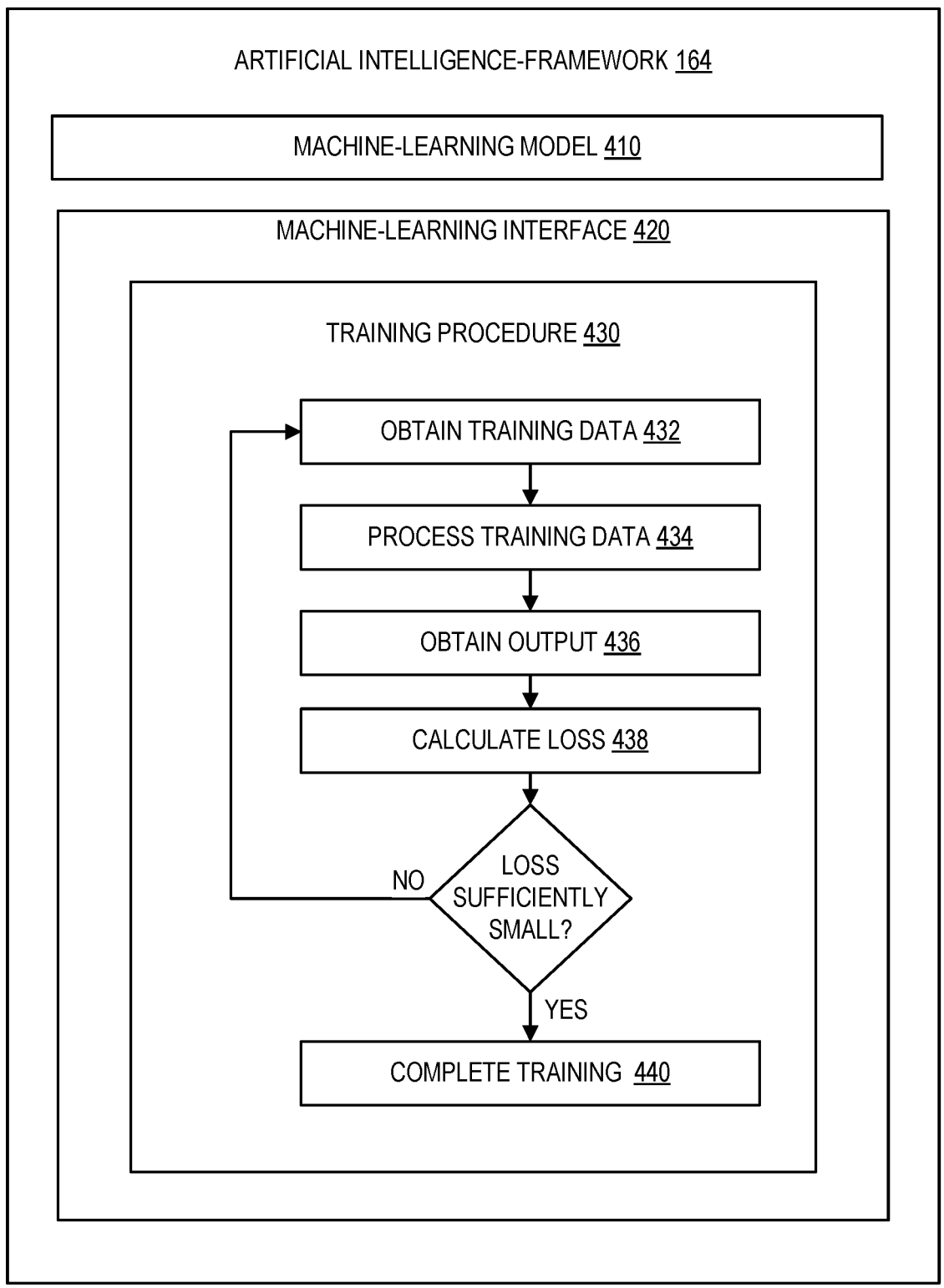
FIG. 4 illustrates an example machine-learning framework that can be used with examples herein.

FIG. 4 illustrates an example artificial intelligence framework 164 that can be used with examples herein. For example, the implantable medical device 102, the recipient computing device 140, the server 160, the clinician computing device 170, or another device can store and operate the artificial intelligence framework 164. The artificial intelligence framework 164 can be software instructions and associated data that implements artificial intelligence capabilities.

In examples, the artificial intelligence framework 164 can define implementations of one or more different artificial intelligence techniques. For example, the artificial intelligence framework 164 can define a decision tree (e.g., the nodes of the decision tree and the connections therebetween).

In the illustrated example, the artificial intelligence framework 164 includes a machine-learning model 410 and a machine-learning interface 420. One or more aspects of the artificial intelligence framework 164 can be implemented with machine-learning toolkits or libraries, such as: TENSORFLOW by GOOGLE INC. of Mountain View, California; OPENAI GYM by OPENAI of San Francisco, California; or MICROSOFT AZURE MACHINE LEARNING by MICROSOFT CORP. of Redmond, Washington.

The machine-learning model 410 is a structured representation of the learning, such as how learning is achieved and what has been learned. For example, where the machine-learning model 410 includes a neural network, the machine-learning model 410 can define the representation of the neural network (e.g., the nodes of the neural network, the connections between the nodes, the associated weighs, and other data), such as via one or more matrices or other data structures.

The machine-learning interface 420 defines a software interface used in conjunction with the machine-learning model 410. For example, the machine-learning interface 420 can define functions, processes, and interfaces for providing input to, receiving output from, training, and maintaining the machine-learning model 410.

In some examples, the machine-learning interface 420 requires the input data to be preprocessed. In other examples, the machine-learning interface 420 can be configured to perform the preprocessing. The preprocessing can include, for example, placing the input data into a particular format for use by the machine-learning model 410. For instance the machine-learning model 410 can be configured to process input data in a vector format and the data provided for processing can be converted into such a format via the preprocessing. In an example, the interface provides functions that convert the provided data into a useful format and then provide the converted data as input into the machine-learning model 410.

The machine-learning interface 420 can define a training procedure 430 for preparing the machine-learning model 410 for use. The artificial intelligence framework 164 can be trained or otherwise configured to receive data as input and provide an output based thereon. For example, the machine-learning model 410 can be trained to receive data or parameters described herein as input and provide, as output, an indication of whether the provided data is indicative of a potential condition of the recipient's vestibular system or cochlear system. The training procedure 430 can begin with operation 432.

Operation 432 includes obtaining training data. The training data is typically a set of human- or machine-curated data having known training input and desired training output usable to train the machine-learning model 410. In examples herein, the training data can include curated body noise data 211 from many different individuals or that is artificially-created and actual or expected output of the machine-learning model 410 for that data (e.g., whether the provided data is indicative of abnormality). For example, the training data can be obtained from individuals known to be producing abnormal body noises (e.g., having been labeled by a medical professional as being abnormal). In examples, the data stored in the data store 162 can be used as training data. For example, after a clinician reviews entries stored in the data store 162, the data can be updated with a clinician label describing the body noise (e.g., indicating that a body noise indicated abnormal is not actually abnormal). Such labeled data can be used for training. Following operation 432, the flow can move to operation 434.

Operation 434 includes processing the training data. Processing the training data includes providing the training data as input into the machine-learning model 410. In examples, the training data can be provided as input into the machine-learning model 410 using an associated machine-learning interface 420. Then the machine-learning model 410 processes the input training data to produce an output.

Following operation 434, the flow can move to operation 436. Operation 436 includes obtaining the output from the machine-learning model 410. This can include receiving output from a function that uses the machine-learning model 410 to process input data. Following operation 436, the flow can move to operation 438.

Operation 438 includes calculating a loss value. A loss function can be used to calculate the loss value, such as based on a comparison between the actual output of the machine-learning model 410 and the expected output (e.g., the training output that corresponds to the training input provided). Any of a variety of loss functions can be selected and used, such as mean square error or hinge loss. Attributes of the machine-learning model 410 (e.g., weights of connections in the machine-learning model) can be modified based on the loss value, thereby training the model.

If the loss value is not sufficiently small (e.g., does not satisfy a threshold), then the flow can return to operation 432 to further train the machine-learning model 410. This training process continues for an amount of training data until the loss value is sufficiently small. If the loss value is sufficiently small (e.g., less than or equal to a predetermined threshold), the flow can move to operation 440.

Operation 440 includes completing the training. In some examples, completing the training includes providing the artificial intelligence framework 164 for use in production. For example, the artificial intelligence framework 164 with the trained machine-learning model 410 can be stored on the implantable medical device 102, the recipient computing device 140, the server 160, the clinician computing device 170, or at another location for use. In some examples, prior to providing the artificial intelligence framework 164 for use, the trained machine-learning model 410 is validated using validation input-output data (e.g., data having desired outputs corresponding to particular inputs that are different from the training data), and after successful validation, the artificial intelligence framework 164 is provided for use.

The machine-learning model 410 can include multiple different types of machine-learning techniques. For example, the machine-learning model 410 can define multiple different neural networks, decision trees, and other machine-learning techniques and their connections therebetween. For instance, output of a first neural network can flow to the input of a second neural network with the output therefrom flowing into a decision tree to produce a final output.

Example Computing System

Figure 5:
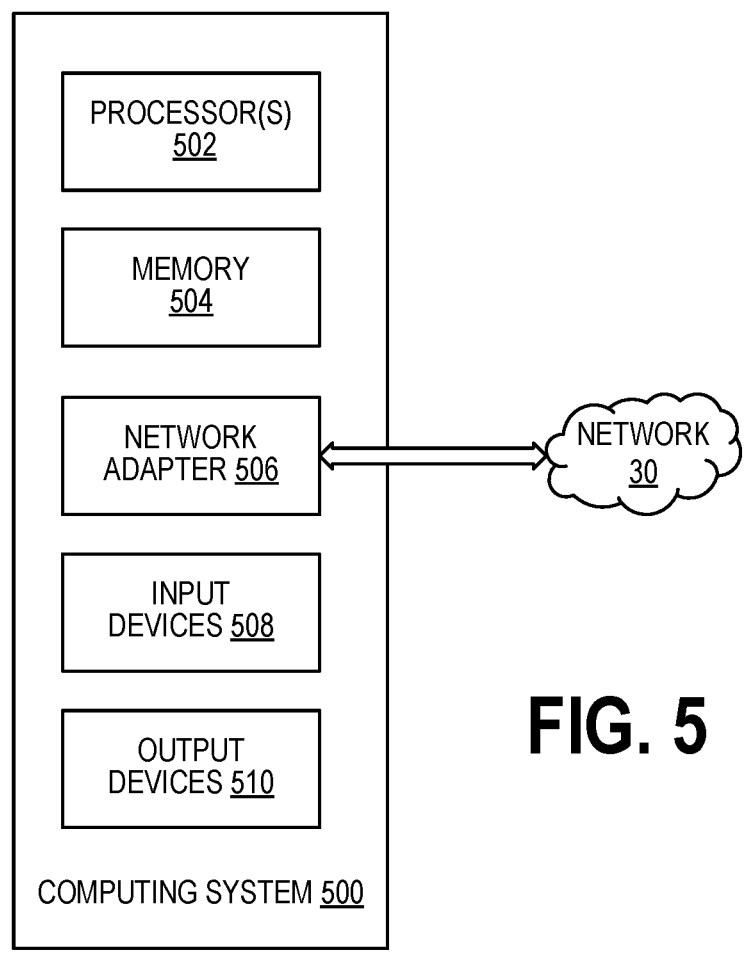
FIG. 5 illustrates an example of a suitable computing system with which one or more of the disclosed examples can be implemented.

FIG. 5 illustrates an example of a suitable computing system 500 with which one or more of the disclosed examples can be implemented. Computing systems, environments, or configurations that can be suitable for use with examples described herein include, but are not limited to, personal computers, server computers, hand-held devices, laptop devices, multiprocessor systems, microprocessor-based systems, programmable consumer electronics (e.g., smart phones), network PCs, minicomputers, mainframe computers, tablets, distributed computing environments that include any of the above systems or devices, and the like. The computing system 500 can be a single virtual or physical device operating in a networked environment over communication links to one or more remote devices. The remote device can be a medical device (e.g., implantable medical device 102), a personal computer, a server, a router, a network personal computer, a peer device or other common network node. In examples, the recipient computing device 140, the secondary device 150, the server 160, and the clinician computing device can include one or more components or variations of components of the computing system 500. Further, in some examples, the implantable medical device 102 and the external medical device 106 includes one or more components of the computing system 500.

In its most basic configuration, computing system 500 includes one or more processors 502 and memory 504.

The one or more processors 502 include one or more hardware or software processors (e.g., Central Processing Units) that can obtain and execute instructions. The one or more processors 502 can communicate with and control the performance of other components of the computing system 500.

The memory 504 is one or more software- or hardware-based computer-readable storage media operable to store information accessible by the one or more processors 502. The memory 504 can store, among other things, instructions executable by the one or more processors 502 to implement applications or cause performance of operations described herein, as well as other data. The memory 504 can be volatile memory (e.g., RAM), non-volatile memory (e.g., ROM), or combinations thereof. The memory 504 can include transitory memory or non-transitory memory. The memory 504 can also include one or more removable or non-removable storage devices. In examples, the memory 504 can include RAM, ROM, EEPROM (Electronically-Erasable Programmable Read-Only Memory), flash memory, optical disc storage, magnetic storage, solid state storage, or any other memory media usable to store information for later access. In examples, the memory 504 encompasses a modulated data signal (e.g., a signal that has one or more of its characteristics set or changed in such a manner as to encode information in the signal), such as a carrier wave or other transport mechanism and includes any information delivery media. By way of example, and not limitation, the memory 504 can include wired media such as a wired network or direct-wired connection, and wireless media such as acoustic, RF, infrared and other wireless media or combinations thereof.

In the illustrated example, the system 500 further includes a network adapter 506, one or more input devices 508, and one or more output devices 510. The system 500 can include other components, such as a system bus, component interfaces, a graphics system, a power source (e.g., a battery), among other components.

The network adapter 506 is a component of the computing system 500 that provides network access. The network adapter 506 can provide wired or wireless network access and can support one or more of a variety of communication technologies and protocols, such as ETHERNET, cellular, BLUETOOTH, near-field communication, and RF (Radiofrequency), among others. The network adapter 506 can include one or more antennas and associated components configured for wireless communication according to one or more wireless communication technologies and protocols.

The one or more input devices 508 are devices over which the computing system 500 receives input from a user. The one or more input devices 508 can include physically-actuatable user-interface elements (e.g., buttons, switches, or dials), touch screens, keyboards, mice, pens, and voice input devices, among others input devices.

The one or more output devices 510 are devices by which the computing system 500 is able to provide output to a user. The output devices 510 can include, displays, speakers, and printers, among other output devices.

As should be appreciated, while particular uses of the technology have been illustrated and discussed above, the disclosed technology can be used with a variety of devices in accordance with many examples of the technology. The above discussion is not meant to suggest that the disclosed technology is only suitable for implementation within systems akin to that illustrated in the figures. In general, additional configurations can be used to practice the processes and systems herein and/or some aspects described can be excluded without departing from the processes and systems disclosed herein.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and processes to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure. Further, the disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A method comprising:
    obtaining, over a period of time, vestibular biological state data with an implanted vestibular sensor configured to be implanted in a recipient;
    obtaining, over the period of time, external sensor data with one or more external devices associated with the recipient;
    determining changes in one or both of the vestibular biological state data and the external sensor data over the period of time;
    determining a performance of a vestibular system of the recipient based on the changes; and
    modifying a stimulation parameter used to provide a stimulation to the vestibular system based on the performance.

2. The method of claim 1, wherein the period of time is greater than one day.

3. The method of claim 1, wherein the vestibular biological state data includes data regarding an impedance of one or more electrodes used to provide the stimulation to the vestibular system of the recipient.

4. The method of claim 1, wherein obtaining the vestibular biological state data includes:
   causing vestibular stimulation with a vestibular electrode; and
   measuring a neural or myogenic response to the vestibular stimulation.

5. The method of claim 1, wherein determining the performance includes:
   providing the external sensor data and the vestibular biological state data as input into an artificial intelligence framework;
   obtaining an output from the artificial intelligence framework; and
   using the output from the artificial intelligence framework in determining the performance.

6. The method of claim 1, wherein determining changes in one or both of the vestibular biological state data and the external sensor data over the period of time includes comparing vestibular biological state data obtained at a beginning of the period of time with vestibular biological state data obtained at an end of the period of time.

7. The method of claim 1, comprising determining the performance of the vestibular system of the recipient based on the changes in both of the vestibular biological state data and the external sensor data over the period of time.

8. The method of claim 1, wherein the stimulation parameter comprises at least one of a stimulation frequency, stimulation intensity, auto pulse width selection, electrode selection, multipolar configuration selection, or current flow route.

9. The method of claim 8, wherein modifying the stimulation parameter comprises at least one of increasing the stimulation frequency or increasing the stimulation intensity.

10. A non-transitory computer-readable medium having instructions thereon that, when executed by one or more processors, cause the one or more processors to:
    obtain vestibular biological state data from a vestibular device of a recipient;
    obtain external sensor data from one or more external devices associated with the recipient;
    store the obtained vestibular biological state data and external sensor data;
    determine one or more trends in the obtained vestibular biological state data and external sensor data;
    determine a performance of a vestibular system of the recipient based on the one or more trends; and
    modifying a stimulation parameter used to provide a stimulation to the vestibular system based on the performance.

11. The non-transitory computer-readable medium of claim 10, wherein the vestibular biological state data includes data regarding a transimpedance associated with electrodes used to stimulate the vestibular system of the recipient.

12. The non-transitory computer-readable medium of claim 10, wherein the vestibular biological state data includes a neural or myogenic response to electrical stimulation.

13. The non-transitory computer-readable medium of claim 10, wherein to determine the performance includes to:
    provide the external sensor data and the vestibular biological state data as input into an artificial intelligence framework;
    obtain an output from the artificial intelligence framework; and
    use the output from the artificial intelligence framework in determining the performance.

14. The non-transitory computer-readable medium of claim 10, wherein to determine one or more trends includes to:
    determine trends in one or more parameters, wherein the one or more parameters include:
    the recipient's stability when standing;
    the recipient's stability or consistency of gait when walking;
    a time it takes the recipient to stand from a sitting position;
    a time it takes the recipient to sit from a standing position;
    a percent of time in a day the recipient is walking, standing, sitting, or lying prone;
    the recipient's walking speed;
    the recipient's walking distance;
    the recipient's time in walking up or down stairs;
    the recipient's stability in walking up or down stairs; or
    the recipient's count, severity, regularity or trend of falls or stumbles.

15. The non-transitory computer-readable medium of claim 10, wherein the external sensor data includes accelerometer data from at least two different external devices.

16. The non-transitory computer-readable medium of claim 10, wherein the one or more external devices include one or more of a wearable consumer electronics device, a virtual reality or augmented reality headset, a phone, or a wearable medical device.

17. A system comprising:
    a vestibular device adapted for use by a recipient; and
    one or more processors configured to:
    obtain vestibular biological state data from the vestibular device of the recipient;
    obtain external sensor data from an external device of the recipient;
    store the obtained vestibular biological state data and external sensor data;
    monitor one or more trends in the obtained vestibular biological state data and external sensor data;
    determine a performance of a vestibular system of the recipient based on the one or more trends; and
    responsive to determining the performance, transmit an instruction to the vestibular device to modify a stimulation parameter used to provide a stimulation to the vestibular system of the recipient.

18. The system of claim 17, wherein the one or more processors are further configured to:
    provide at least some of the one or more trends, the obtained vestibular biological state data, or the external sensor data as input into an artificial intelligence framework; and
    obtain an output from the artificial intelligence framework,
    wherein the one or more processors are configured to determine the performance based on the output from the artificial intelligence framework.

19. The system of claim 18, wherein the system further comprises:
    an implanted cochlear device adapted for use by the recipient,
    wherein the one or more processors are further configured to obtain cochlear sensor data from the implanted cochlear device, and wherein the one or more processors are configured to determine the performance of the vestibular system of the recipient further based on the obtained cochlear sensor data.

20. The system of claim 19, wherein the system further comprises an implanted biocompatible housing and wherein the implanted biocompatible housing includes the one or more processors.

21. The system of claim 19, wherein the one or more processors are configured to:
   instruct the implanted cochlear device to apply a cochlear stimulation to the recipient; and
   obtain cochlear sensor data as a response to the cochlear stimulation.

22. The system of claim 19, wherein the one or more processors are configured to:
   transmit an instruction to the vestibular device to reduce stimulation provided to the recipient while obtaining the cochlear sensor data from the recipient.

23. The system of claim 17, wherein the one or more processors are further configured to:
   recommend a treatment responsive to determining the performance of the vestibular system of the recipient.

24. The system of claim 23, wherein the treatment relates to vestibular stimulation therapy for the recipient.

* * * * *